United States Patent
Ooga

(10) Patent No.: US 6,453,231 B1
(45) Date of Patent: Sep. 17, 2002

(54) AIR TRAFFIC CONTROL SUPPORT SYSTEM

(75) Inventor: Yasuisa Ooga, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/834,655

(22) Filed: Apr. 16, 2001

(30) Foreign Application Priority Data

Oct. 11, 2000 (JP) .................................... 2000-310240

(51) Int. Cl.⁷ .............................................. G06F 19/00
(52) U.S. Cl. ........................ 701/120; 701/14; 701/15; 701/16; 342/29; 340/951; 340/961
(58) Field of Search ........................... 701/120, 14, 15, 701/16, 17; 340/951, 961; 342/32, 37, 26, 29

(56) References Cited

U.S. PATENT DOCUMENTS 5,845,874 A * 12/1998 Beasley ..................... 244/1 R

FOREIGN PATENT DOCUMENTS

| JP | 3-220486 | 9/1991 |
| JP | 4-246800 | 9/1992 |
| JP | 9-66900 | 3/1997 |
| JP | 9-119983 | 5/1997 |

* cited by examiner

Primary Examiner—Yonel Beaulieu
(74) Attorney, Agent, or Firm—Oblon, Spivak, McClelland, Maier & Neustadt, P.C.

(57) ABSTRACT

An air traffic control support system comprises:
a wake turbulence detecting unit adapted to detect a wake turbulence occurring in a runway sky due to taking off or landing of an aircraft;
a decay time predicting unit adapted to predict decay time of the wake turbulence;
a weather information acquiring unit adapted to acquire weather information in the surroundings around the runway; and
a display unit adapted to display the decay time,
wherein the decay time predicting unit predicts the decay time of the wake turbulence detected by the wake turbulence detecting unit on the basis of the weather information.

25 Claims, 18 Drawing Sheets

AIR TRAFFIC CONTROL SUPPORT SYSTEM

BACKGROUND OF THE INVENTION

1. Field of the Invention

The present invention relates to an air traffic control support system for supporting the operating control of aircraft in or around an airport from a ground station.

2. Description of the Related Art

In recent years, the safety of an aircraft has greatly improved by support from the ground station with radar or an air traffic control system. Such air traffic control support systems may include, for example, an aerodrome radar processing unit for performing the traffic control of aircraft or vehicle that employs an airport surface detection radar for detecting a target such as an aircraft or vehicle moving within an aerodrome and a precision approach radar (PAR) equipment for use to guide landing of an aircraft approaching to the aerodrome, as disclosed in JP-A-3-220486, and a runway approach warning system for the airport which is improved from the airport surface detection equipment (so-called ASDE), as disclosed in JP-A-9-119983.

In JP-A-9-66900, an apparatus for surveillance of flight conditions of an aircraft has been described to detect weather conditions (temperature, wind velocity and direction) in surroundings around an airport, and create a normal airway in accordance with surrounding conditions under which the aircraft takes off or lands.

In the related air traffic control systems, however, the take-off or landing interval from one aircraft to the next is determined by a controller in accordance with air traffic control orders of each aerodrome and from a flight plan on the basis of an aircraft type, the take-off or landing time, and positional information. In any way, no consideration is particularly taken of an influence of wake turbulence arising on the runway due to taking off or landing of a preceding plane on a succeeding plane. However, there is enough time interval between each taking off or landing to assure the safety of the aircraft operations. In practice, even if the strength of the wake turbulence has decayed to such an extent as not to affect the succeeding plane, the controller makes an instruction of the take-off time to the succeeding plane on the basis of the interval of taking off or landing in accord with the air traffic control orders of the aerodrome. Therefore, there was a problem that the air traffic control is inefficient while the safety of aircraft operations is assured.

In each aerodrome, there is tendency of increasing the number of flights (particularly in rush hours) as uses of the aircraft have expanded in recent years. However, when the taking off or landing interval of aircraft is determined in accord with the air traffic control orders, it is possibly difficult to increase the number of flights. Or if the number of flights is increased by laying another runway, various problems may possibly arise such as need of securing a runway space, and some influence on surrounding environment. It is not easy to realize it.

SUMMARY OF THE INVENTION

This invention has been achieved to solve the above-mentioned problems, and it is an object of invention to provide a new air traffic control support system that can cope with the increasing number of flights by detecting a wake turbulence occurring in the runway sky, and can realize the safer air traffic control.

It is another object of the invention to provide a new air traffic control support system that can prompt the controller to perform a more efficient control instruction.

Incidentally, hereinafter, a runway sky means a sky over a runway.

An air traffic control support system according to a first aspect of the invention, comprises:
  a wake turbulence detecting unit adapted to detect a wake turbulence occurring in a runway sky due to taking off or landing of an aircraft; and
  a decay time predicting unit adapted to predict decay time of the wake turbulence.

An air traffic control support system according to a second aspect of the invention, comprises:
  a wake turbulence detecting unit adapted to detect a wake turbulence occurring in a runway sky due to taking off or landing of an aircraft;
  a decay time predicting unit adapted to predict decay time of the wake turbulence;
  a weather information acquiring unit adapted to acquire weather information in the surroundings around the runway; and
  a display unit adapted to display the decay time,
  wherein the decay time predicting unit predicts the decay time of the wake turbulence detected by the wake turbulence detecting unit on the basis of the weather information.

In a third aspect of the invention, the air traffic control support system according to the second aspect of the invention, is provided wherein the weather information acquiring unit has an airport meteorological Doppler radar installed within an airport.

An air traffic control support system according to a fourth aspect of the invention comprises:
  a wake turbulence detecting unit adapted to detect a wake turbulence occurring in a runway sky due to taking off or landing of an aircraft;
  a decay time predicting unit adapted to predict decay time of the wake turbulence;
  an aircraft detecting unit adapted to detect airframe information of an aircraft;
  a take-off time predicting unit adapted to predict take-off time of the aircraft being stand-by to take off on the runway, on the basis of the airframe information of the aircraft and the decay time; and
  a display unit adapted to display the take-off time.

An air traffic control support system according to a fifth aspect of the invention comprises:
  a wake turbulence detecting unit adapted to detect a wake turbulence occurring in a runway sky due to taking off or landing of an aircraft;
  a decay time predicting unit adapted to predict decay time of the wake turbulence;
  a data storage unit adapted to store past decay time information of wake turbulence occurring in the runway sky; and
  a display unit adapted to display the decay time, wherein the decay time predicting unit extracts, from the past decay time information, decay time information corresponding to the wake turbulence detected by the wake turbulence detecting unit to calculate the decay time of the wake turbulence detected by the wake turbulence detecting unit on the basis of the decay time information.

An air traffic control support system according to a sixth aspect of the invention comprises:
  a wake turbulence detecting unit adapted to detect a wake turbulence occurring in a runway sky due to taking off or landing of an aircraft;

a decay time predicting unit adapted to predict decay time of the wake turbulence; and a display unit adapted to display the decay time, wherein the decay time predicting unit predicts the decay time on the basis of temporal changes of the wake turbulence detected by the wake turbulence detecting unit.

An air traffic control support system according to a seventh aspect of the invention comprises:

a wake turbulence detecting unit adapted to detect a wake turbulence occurring in a runway sky due to taking off or landing of an aircraft;

a decay time predicting unit adapted to predict decay time of the wake turbulence; and a transmission unit adapted to convert the decay time into an aural signal and transmit the aural signal to an aircraft being stand-by to take off or land, wherein the aural signal is output in voice on the aircraft.

An air traffic control support system according to a eighth aspect of the invention comprises:

a wake turbulence detecting unit adapted to detect a wake turbulence occurring in a runway sky due to taking off or landing of an aircraft;

a decay time predicting unit adapted to predict decay time of the wake turbulence; and a transmission unit adapted to convert the decay time into a message signal and transmit the message signal to an aircraft being stand-by to take off or land, wherein the message signal is displayed on the aircraft.

An air traffic control support system according to a ninth aspect of the invention comprises:

an aircraft detecting unit adapted to detect an aircraft by the use of a plurality of radar apparatuses and to generate aircraft information;

a data storage unit adapted to store map information corresponding to the plurality of radar apparatuses;

a wake turbulence detecting unit adapted to detect a wake turbulence occurring in a runway sky due to taking off or landing of an aircraft and to generate wake turbulence information;

an image synthesizing process section adapted to synthesize images of the aircraft information, the map information, and the wake turbulence information to output the images as air traffic control information corresponding to the plurality of radar apparatuses; and a display unit adapted to display the air traffic control information in a plurality of subwindows positioned on a screen.

In a tenth aspect of the invention, the air traffic control support system according to any one of the first to ninth aspects, is provided wherein the wake turbulence detecting unit has an optical transmitter-receiver scanning with a laser beam.

DETAILED DESCRIPTION OF THE PREFERRED EMBODIMENTS

Embodiment 1

Figure 1:
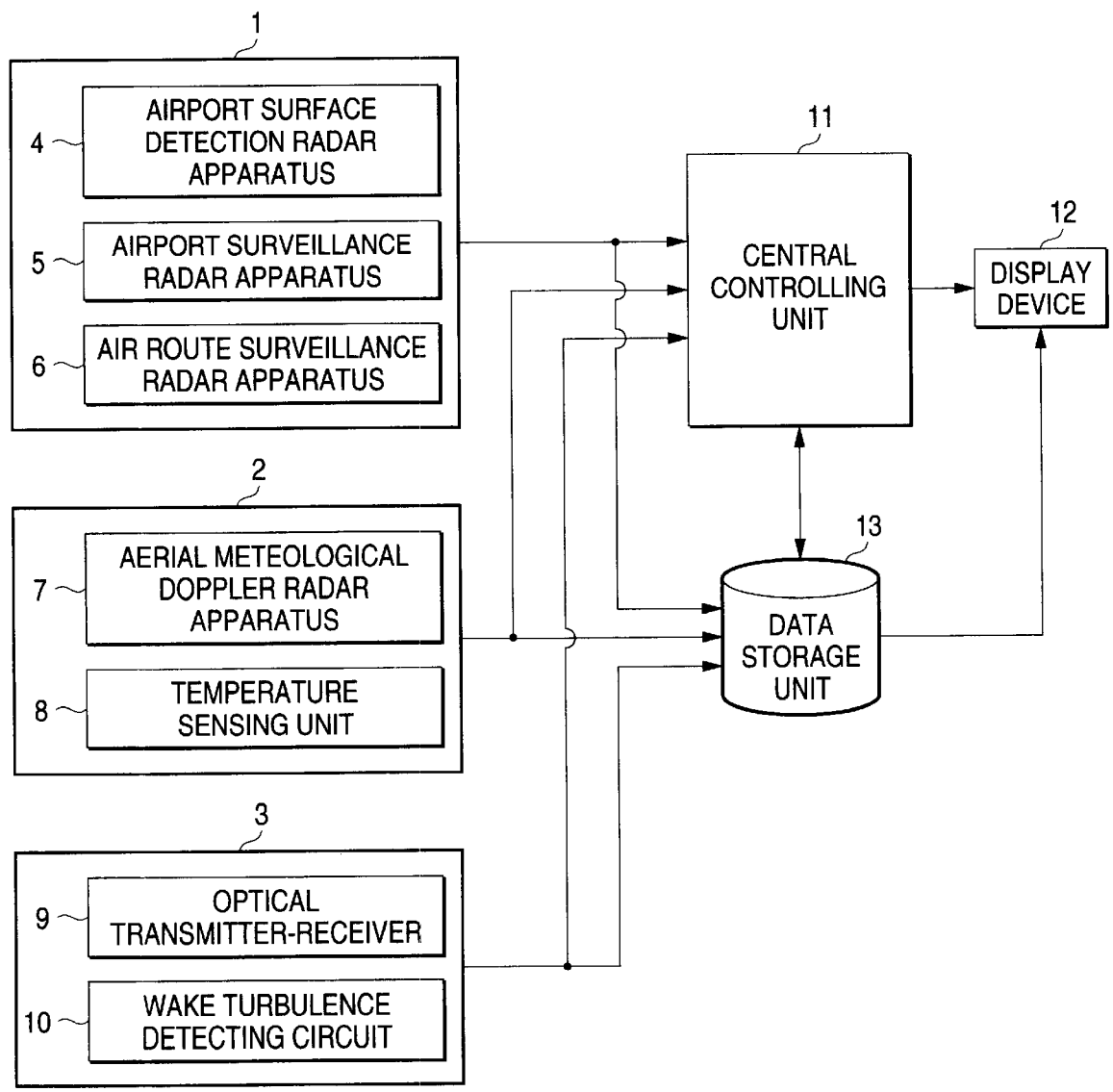
FIG. 1 is a block diagram showing an air traffic control support system according to one embodiment of the present invention.
Figure 2A:
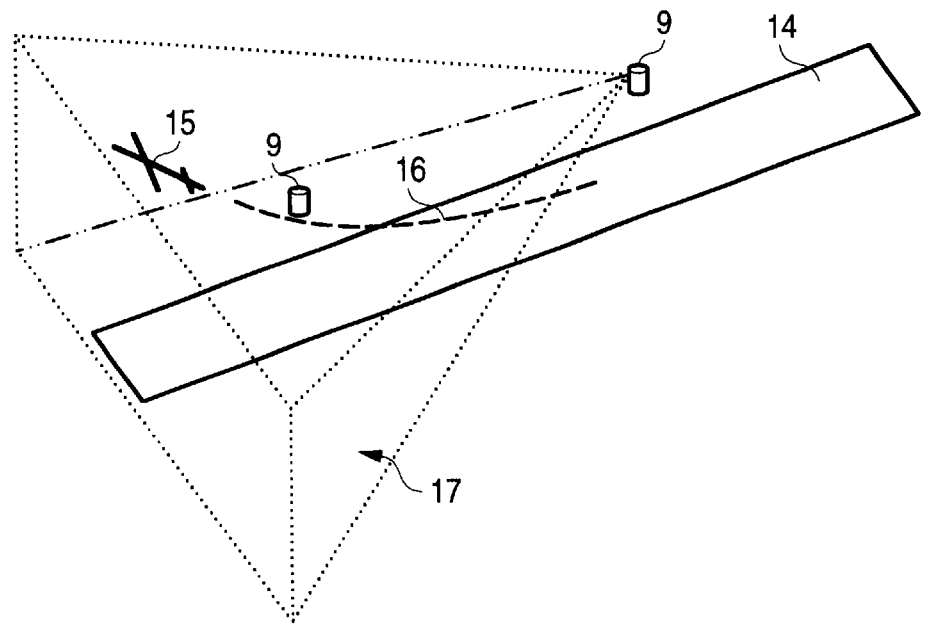
FIG. 2 is an explanatory view for explaining an observation situation of wake turbulence with wake turbulence detecting unit as shown in FIG. 1.
Figure 2B:
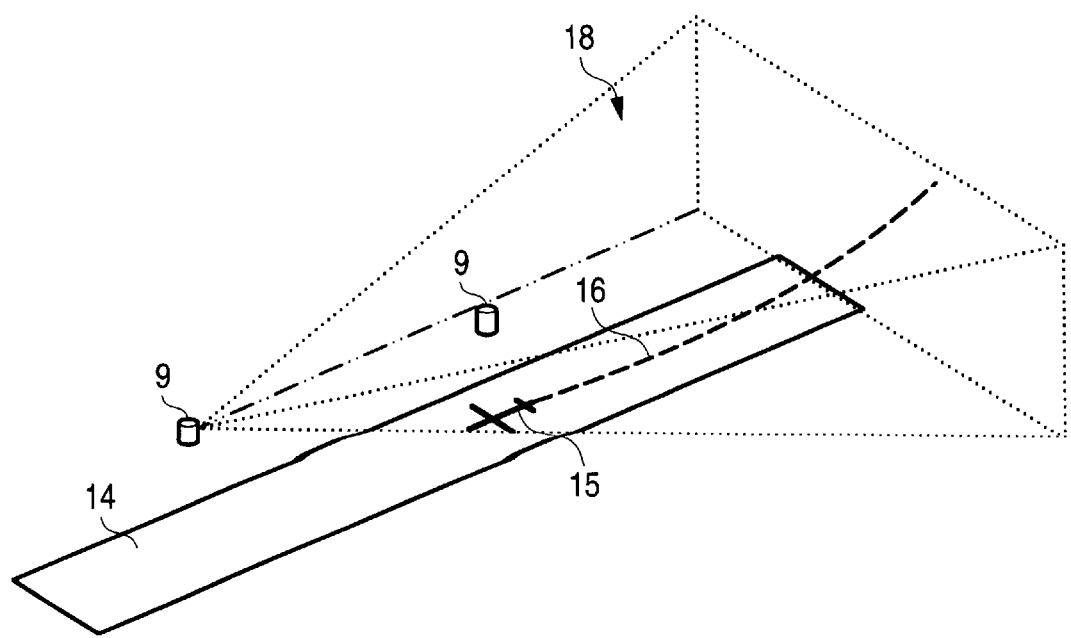

One embodiment of the invention will be described below with reference to FIGS. 1 to 7. FIG. 1 is a block diagram showing an air traffic control support system according to one embodiment of the invention. FIGS. 2A and 2B are explanatory views for explaining a situation of observing wake turbulence by a wake turbulence detecting unit as shown in FIG. 1. In FIG. 1, reference numeral 1 denotes an aircraft detecting unit configured by a plurality of radar apparatuses that are employed to acquire so-called aircraft information, such as positional information and airframe information of each aircraft, in an airport surface or an air area around the airport. Reference numeral 2 denotes a meteorological information acquiring unit for acquiring various kinds of meteorological information in the airport surface or the air area around the airport by means of an airport meteorological Doppler radar apparatus or a temperature sensor. Reference numeral 3 denotes a wake turbulence observation unit for acquiring information as to the wake turbulence occurring in runway sky, on the basis of an observation data of a wake turbulence sensor installed at a predetermined position within the aerodrome.

Reference numerals 4 to 6 represent various radar apparatuses construct the aircraft detecting unit 1. Reference numeral 4 denotes an airport surface detection equipment (typically referred as to ASDE) for detecting positional information of an aircraft moving on a runway or a taxiway or airframe information of each aircraft from a received video signal by searching the airport surface. Reference numeral 5 denotes an airport surveillance radar apparatus (typically referred to as ASR) for detecting positional information of an aircraft departing from the runway or approaching to the runway from a received video signal by surveilling a terminal area around the airport surface. Reference numeral 6 denotes an air route surveillance radar (typically referred to as ARSR) for detecting positional information or airframe information of an aircraft in an airport surrounding area around the terminal area on the basis of a received video signal or a call sign from the aircraft. Each of these various kinds of aircraft information can be obtained at every radar scan of each radar apparatus. The radar apparatuses 4, 5 and 6 are equipped with a scan conversion device for scan converting the aircraft information into a television scan signal.

Reference numeral 7 denotes the airport meteorological Doppler radar apparatus for detecting the wind direction, wind velocity and rain-fall information over a wide range of the airport surface or airport surrounding area, the airport meteorological Doppler radar apparatus is installed, for example, within an aerodrome site. Reference numeral 8 denotes a temperature detection unit for detecting temperature information within the airport surface by the use of a temperature gage disposed at a position in the runway sky. Other units for constructing the meteorological information acquiring unit 2 may include a wind vane, an air speedometer and a rain gage installed within the airport, for example. In case that the airport meteorological Doppler radar apparatus 7 can not be provided, the wind direction, wind velocity and rainfall information can be acquired by the use of the wind vane, the air speedometer and the rain gage. Also, the wind direction, wind velocity and rainfall information can be acquired from a received data of an optical transmitter-receiver 9 described hereinafter. Note that the wind direction, wind velocity and rain-fall information can be also acquired from the meteorological information over the wide area, such as the AMeDAS information provided by the Meteorological Agency, but the AMeDAS information covers observation units over the wide area, and an aerial Doppler radar apparatus, for example, may be desirable which can detect the wind direction, wind velocity and rain-fall information in a local area to acquire correct weather information in the airport surrounding area.

Reference numeral 9 denotes the optical transmitter-receiver for scanning a laser beam for a wake turbulence occurring in the runway sky to receive a reflected wave. Reference numeral 10 denotes a wake turbulence detecting circuit for calculating the wind direction and the wind velocity distribution from the received data by the optical transmitter-receiver 9 to detect the wake turbulence based on change of the wind direction and wind velocity with respect to the calculated wind direction and wind velocity distribution. The wake turbulence occurring in the runway sky due to the taking off or landing of an aircraft is an eddying air current occurring oppositely from a left and right main wings of the aircraft, and whereby the wake turbulence information can be acquired from the change of the wind direction and wind velocity. Note that the laser beam transmitted from the optical transmitter-receiver 9 to the wake turbulence occurring in the runway sky has a diameter of about 10 mm to make the energy density small from the view point of safety.

Reference numeral 11 denotes a central controlling unit for controlling a air traffic control processing of the aircraft in the airport surface and the airport surrounding area on the basis of an air traffic control program or an external instruction (e.g., instructed by an input operation from the keyboard or the like) from an air traffic controller (hereinafter simply referred to as a controller). Reference numeral 12 denotes a display device for displaying various kinds of air traffic information processed by the central controlling unit 11 on a display unit of a monitor. Reference numeral 13 denotes a data storage unit for storing in advance various kinds of programs or air traffic data, or storing the aircraft information acquired by the aircraft detecting unit 1, the weather information acquired by the weather information acquiring unit 5 and the wake turbulence information acquired by the wake turbulence detecting unit 8, for example. The central controlling unit 11 performs operation control collectively for the aircraft information acquiring unit 1, the weather information acquiring unit 2 and the wake turbulence detecting unit 3 on the basis of the air traffic control programs, besides a decay predicting process for the wake turbulence described later.

An operation of the air traffic control support system according to this embodiment of the invention will be described below. First of all, the aircraft detecting unit 1 detects the positional information and the airframe information of each aircraft in the airport surface and the airport surrounding area by the use of the radar apparatuses 4, 5 and 6. The positional information of each aircraft is detected on the basis of a received video signal and a radar angle signal of each radar apparatus, and the airframe information is detected on the basis of the spread of reception video of the received video signal or a call sign from each aircraft. In this way, each radar apparatus 4, 5, 6 is equipped with a unit for detecting the positional information and the airframe information of the aircraft from the received video signal. For example, the airport surface detection radar apparatus 4 can discriminate the size of the aircraft from the spread of reception video of the received video signal, and grasp which type of aircraft is present at which location in the airport surface on the basis of the positional information and the airframe information from the airport surface detection radar apparatus 4. Each aircraft information detected by each radar apparatus 4, 5, 6 and each television scan signal undergone scan conversion are output to the central controlling unit 11 and the data storage unit 13.

In the weather information acquiring unit 2, the wind direction, wind velocity and rain-fall information over the wide range in the airport and the airport surrounding area are detected by the aerial meteorological Doppler radar apparatus 7, and the temperature information in the airport surface including the runway is detected by the temperature detecting unit 8. The wind direction, wind velocity and rain-fall information, as well as the temperature information in the airport surface, which are detected by the aerial meteorological Doppler radar apparatus 7 and the temperature detecting unit 8, are output to the central controlling unit 11 and the data storage unit 13 as the weather information from the weather information acquiring unit 5. Normally, it is believed that the wake turbulence in the runway sky occurring due to the taking off or landing of an aircraft will decay or move from the runway sky in one or two minutes. In an early morning with strong radiation cooling (a phenomenon that it is cool in lower layer of the atmosphere and warm in higher layer thereof), or when wind around the airport is weak, the wake turbulence occurring may sustain for a few minutes in relatively strong state. Thus in case of predicting the decay or movement of the wake turbulence, it is very beneficial to acquire the weather information when the wake turbulence occurs.

In the wake turbulence detecting unit 8, if the wake turbulence occurs in the runway sky due to the taking off or landing of an aircraft, the optical transmitter-receiver 9 performs the radar scanning for the wake turbulence occurring in the runway sky, so that the received data based on its reflected wave is output to the wake turbulence detection circuit 10. In the wake turbulence detection circuit 10, the wind direction and the wind velocity distribution are calculated from the received data input, and the wake turbulence information (magnitude, intensity and so on) of the wake turbulence occurring in the runway sky is detected from the calculated wind direction and the calculated wind velocity distribution. More specifically, since two-dimensional or three-dimensional wind direction or speed information can be obtained from the received data by the optical transmitter-receiver 9, the wind direction and the wind velocity distribution distinguishable as the wake turbulence, e.g., eddying wind direction and wind velocity distribution, are extracted from the wind direction and wind velocity information, and the wake turbulence information including the magnitude and intensity of the wake turbulence can be detected from the eddying wind direction and wind velocity distribution. The wake turbulence information detected by the wake turbulence detection circuit 10 is output to the central controlling unit 11 and the data storage unit 13.

The optical transmitter-receiver 9 installed within the airport may be single, or double for the take-off and the landing as shown in FIGS. 2A and 2B, for example. Since the optical transmitter-receiver of rotary scan method takes much time to perform the radar scanning, it may be possible to install two or more optical transmitter-receivers 9 to shorten the time required to perform the radar beam scanning. FIG. 2A is an explanatory view illustrating a situation of observing the wake turbulence occurring when the aircraft takes off, and FIG. 2B is an explanatory view illustrating a situation of observing the wake turbulence occurring when the aircraft lands. FIG. 2 visually shows a runway 14, an aircraft 15 that takes off or lands on the runway 14, a track 16 of the aircraft 15 taking off or landing on the runway 14, and radar beam scan ranges 17, 18 of the radar scanning performed by the optical transmitter-receiver 9. Since the optical transmitter-receiver 9 performs the radar scanning over the entire area of the beam scan ranges 17, 18, the wake turbulence occurring within the beam scan ranges 17, 18 can be detected.

Figure 3:
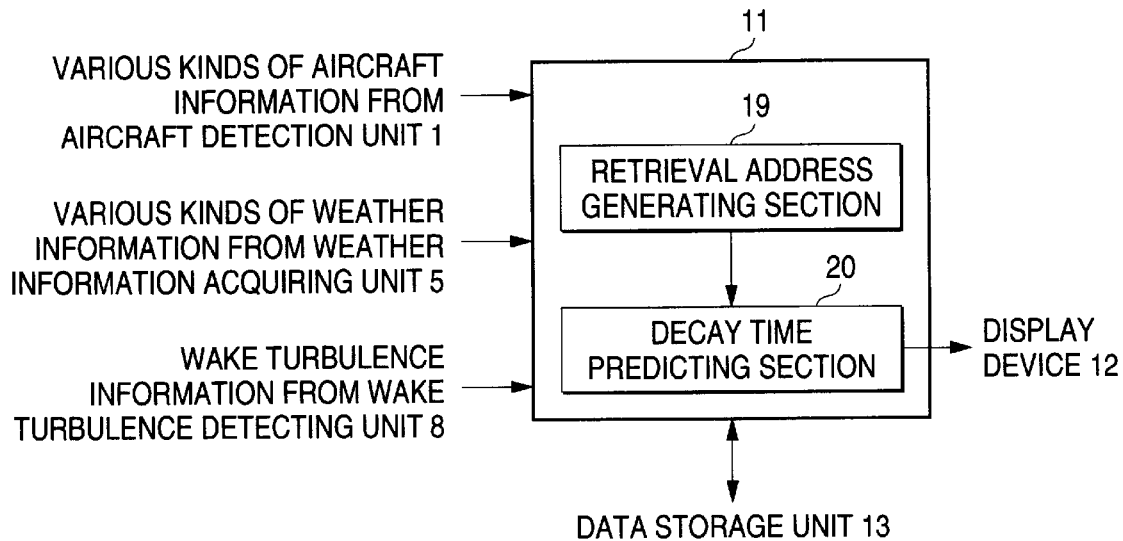
FIG. 3 is a partial block diagram showing partially a specific configuration of a central controlling unit 11 as shown in FIG. 1.
Figure 4:
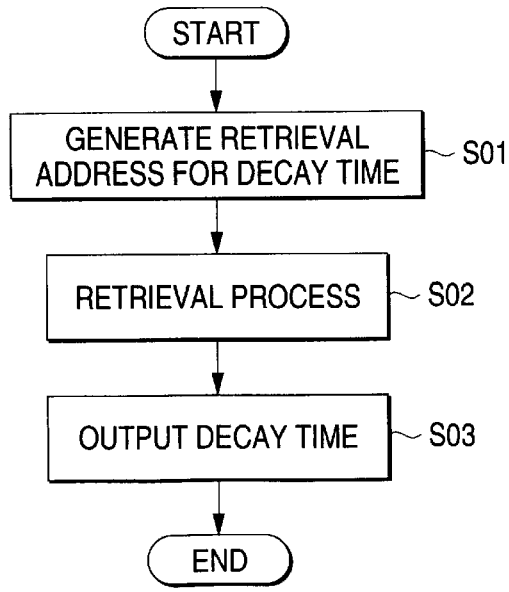
FIG. 4 is a flowchart showing a specific operation procedure of a process for predicting the decay time of the wake turbulence in the central controlling unit 11.

Referring now to FIGS. 3 and 4, a process of predicting the decay time of the wake turbulence in the central controlling unit 11 will be further described below in detail. FIG. 3 is a partial block diagram showing a specific configuration of the central controlling unit 11 as shown in FIG. 1, and particularly, a section of predicting the decay time of the wake turbulence. FIG. 4 is a flowchart showing a specific operation procedure of the portion of predicting the decay time of the wake turbulence in the central controlling unit 11. In FIG. 3, reference numeral 19 denotes a retrieval address generating section for generating the retrieval address for prediction of the decay time of the wake turbulence on the basis of the weather information acquired by the weather information acquiring unit 5 and the wake turbulence information acquired by the wake turbulence detecting unit 8. Reference numeral 20 denotes a decay time prediction section for calculating the predicted decay time of the wake turbulence practically detected by the wake turbulence detection unit 8 on the basis of the decay time of wake turbulence in the past corresponding to the retrieval address and the detection time of the wake turbulence with the wake turbulence detecting unit 8, by retrieving a database as to the wake turbulence in the past stored in the data storage unit 13, for example, in accordance with the retrieval address generated by the retrieval address generator section 19.

If the aircraft information from the aircraft detecting unit 1, the weather information from the weather information acquiring unit 5, and the wake turbulence information from the wake turbulence detecting unit 8 are input to the central controlling unit 11, respectively, the retrieval address generating section 19 first generates the retrieval address for the decay time constructed by a combination of the aircraft information, the weather information and the wake turbulence information (S01). If the retrieval address generating section 19 generates the retrieval address, the decay time prediction section 20 retrieves the database storing the decay time information of the wake turbulence that has occurred in the past on the basis of the retrieval address (S02), and calculates the predicted decay time of the wake turbulence detected by the wake turbulence detecting unit 8 on the basis of the decay time of the wake turbulence in the past corresponding to the retrieval address read out from the database and the observation time of the wake turbulence detecting unit 8 (S03). The predicted decay time calculated by the decay time prediction section 20 is output to the display device 12 as the decay time information of the wake turbulence detected by the wake turbulence detecting unit 8.

Note that the central controlling unit 11 has the aircraft information acquired by the aircraft detecting unit 1, and enables recognition of an aircraft (preceding aircraft) taking off the runway and an aircraft (succeeding aircraft) that is stand-by to take off after the preceding aircraft, on the basis of the position where the wake turbulence occurs detected by the wake turbulence detecting unit 8.

The relation between the retrieval address and the predicted decay time will be described below. The retrieval address is constructed by various kinds of information from the aircraft detecting unit 1, the weather information acquiring unit 5 and the wake turbulence detecting unit 8. However, the wake turbulence occurring in the runway sky has a different decay time, even with the same type of aircraft, if the weather conditions at that time change, as described above. The wake turbulence caused by the succeeding airframe may have different influence according to the succeeding airframe. Accordingly, even though the wake turbulence of equal magnitude and intensity is detected by the wake turbulence detecting unit 8, the predicted decay time calculated by the decay time prediction section 20 may be varied depending on the weather conditions at that time, if the weather information acquired by the weather information acquiring unit 1 changes. The predicted decay time output from the decay time prediction section 20 must be determined at an optimum time in accordance with the weather conditions and the type of the succeeding aircraft.

In the air traffic control support system according to this embodiment of the invention, the decay time of the wake turbulence is observed under various conditions, and the information as to the practical decay time obtained under such conditions and the influence exerted on the succeeding aircraft are stored in the database, together with the observation conditions at that time, for example. Such a database is provided within the data storage unit 13, for example, and the retrieving process with the retrieval address is performed using this database. Thus, the optimal prediction of the decay time can be effected in accordance with the weather conditions at the observation time of the wake turbulence and the type of the succeeding aircraft.

Figure 5:
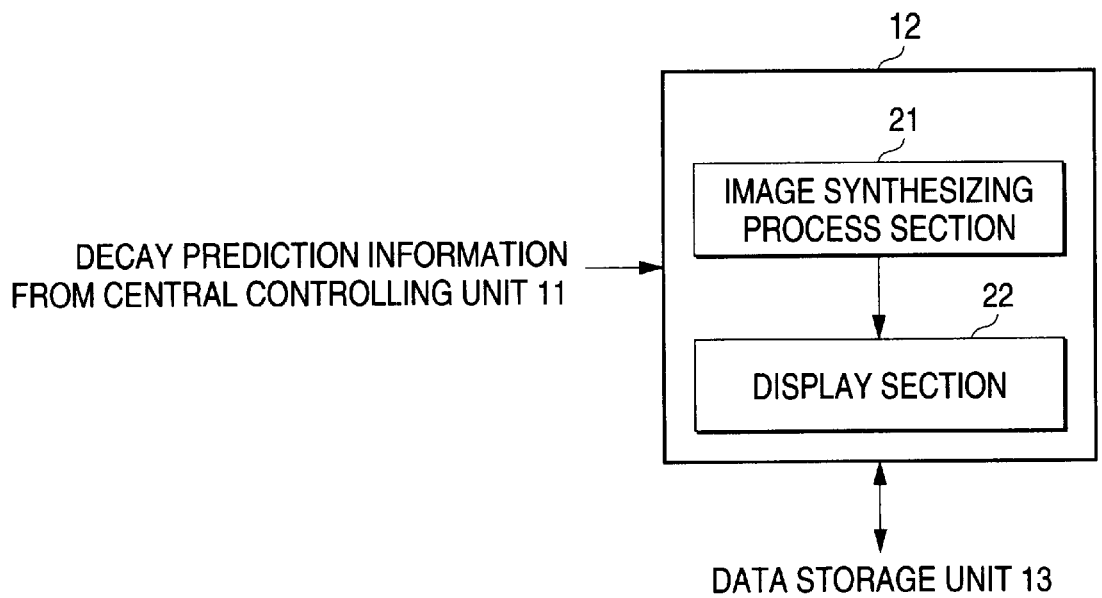
FIG. 5 is a partial block diagram showing a specific configuration of a display device 12 as shown in FIG. 1.
Figure 7:
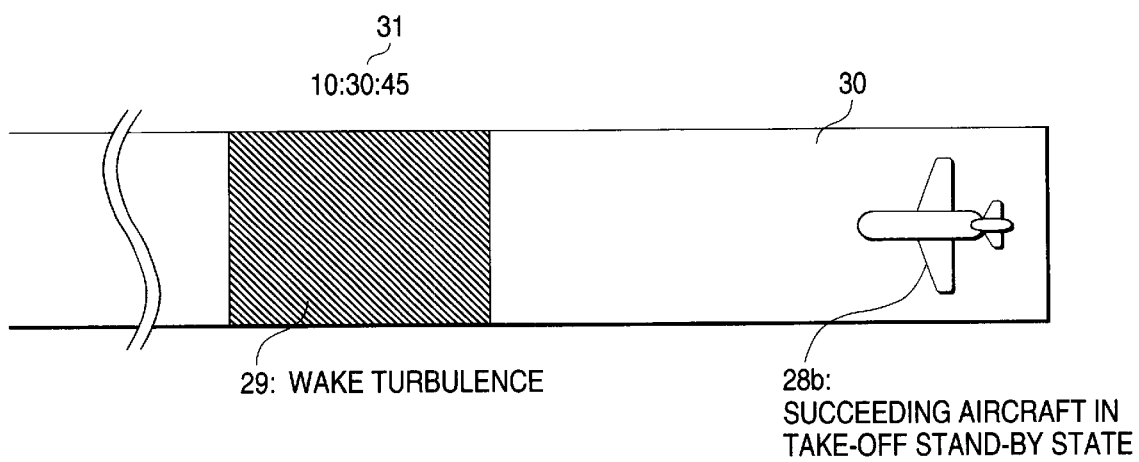
FIG. 7 is an explanatory view of the display screen illustrating partly the display example as shown in FIG. 6.

Referring now to FIGS. 5 and 7, a display process of the display device 12 will be described below. FIG. 5 is a partial block diagram showing a specific configuration of the display device 12. In FIG. 5, reference numeral 21 denotes an image synthesizing process section input a symbol display signal of each aircraft generated on the basis of the aircraft information generated on the basis of each aircraft information from the radar apparatuses 4, 5 and 6, and map information corresponding to the radar apparatuses 4, 5 and 6 stored in advance in the data storage unit 13 to output a display signal in accordance with a display format of the display device. Reference numeral 22 denotes a display device such as CRT or PDP for displaying a desired image on the basis of the display signal from the image synthesizing process section 21. Note that the image synthesizing process section 21 is input the wake turbulence information detected by the wake turbulence detecting unit 8 and further the decay time information of the wake turbulence calculated by the decay time prediction section 20 of the central controlling unit 11. Specifically, the above information is developed into a buffer memory in accordance with the display format of the display device 22 to be undergone synthesizing process for a convoluted display on the same screen, and then output as a display signal of the primary colors (RGB).

Figure 6:
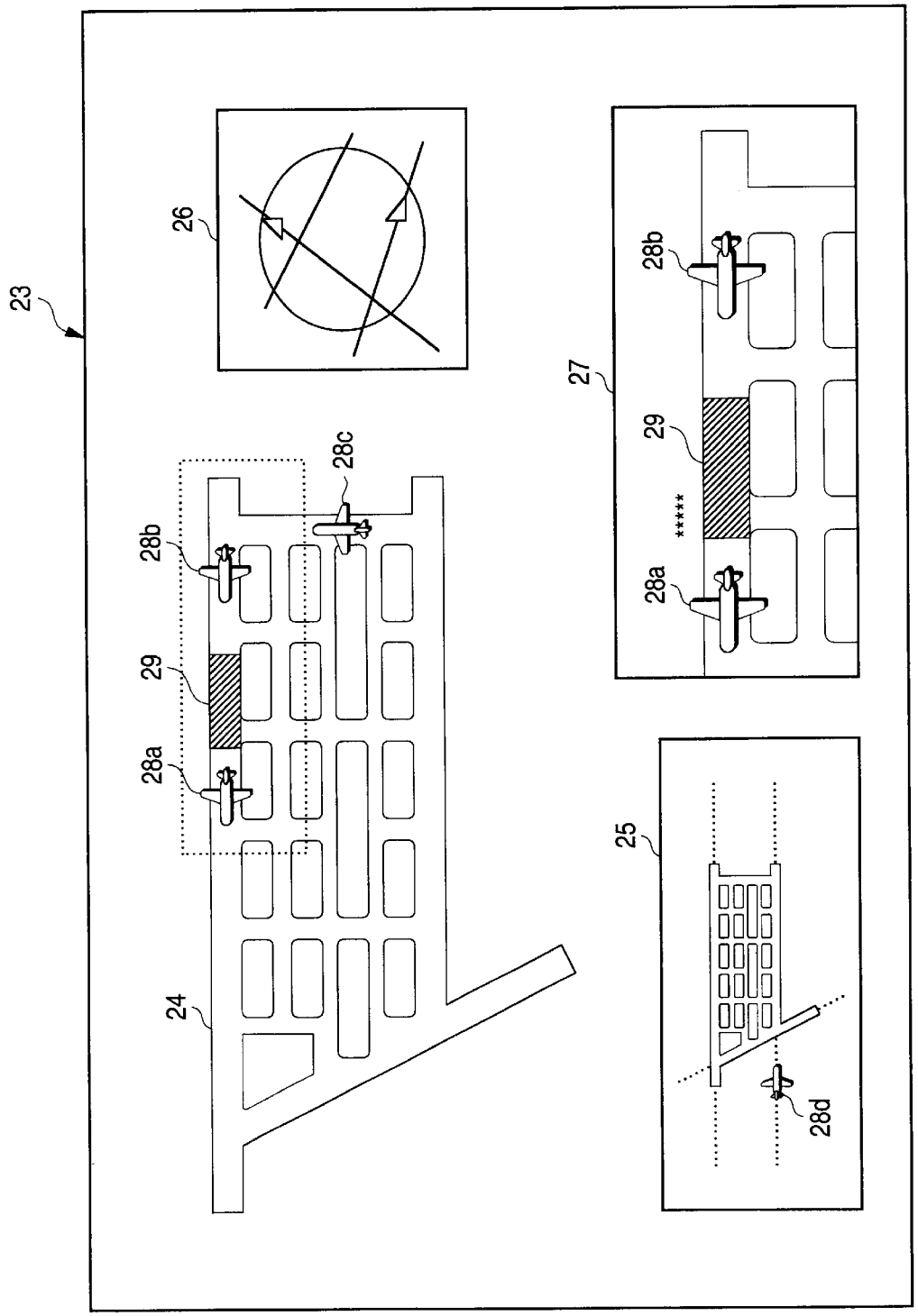
FIG. 6 is an explanatory view of a display screen illustrating a display example in the display device 12 as shown in FIG. 1.

FIG. 6 is an explanatory view of a display unit illustrating a display example on the display device 22 as shown in FIG. 5. As shown in FIG. 6, each aircraft detected by the radar apparatuses 4, 5 and 6 is displayed symbolically, and the display unit can be readily recognized by the controller. Each television scan signal from the radar apparatuses 4, 5 and 6 displayed at the same position as the aircraft displayed symbolically. In FIG. 6, reference numeral 23 denotes a screen frame; reference numeral 24 denotes an airport surface displayed on the display unit; reference numeral 25 denotes a terminal area around an airport displayed on the display unit in a sub-window; reference numeral 27 denotes an airport surrounding area around the terminal area displayed on the display unit in a sub-window; and reference numeral 27 denotes an enlarged display of the airport surface 24 displayed in a sub-window.

Also, reference numerals 28a to 28d denote aircraft displayed symbolically on the basis of the aircraft information from the aircraft detecting unit 1. Reference numeral 29 denotes the wake turbulence caused by the aircraft taking off or landing, which is displayed in color on the basis of the wake turbulence information from the wake turbulence detecting unit 8. More specifically, reference numeral 28a denotes a preceding aircraft that has taken off in the runway sky; reference numeral 28b denotes a succeeding aircraft of the aircraft 28a in a take-off stand-by state at the end of the runway; reference numeral 28c denotes an aircraft that has already landed; reference numeral 28d denotes an aircraft in a landing state; and reference numeral 29 denotes a wake turbulence caused by the preceding aircraft 28a taking off. The intensity of the wake turbulence detected by the wake turbulence detecting unit 8 is distinguishable by changing the color of a part displayed as the wake turbulence, for example, in three stages of red, yellow and blue, wherein the part is displayed in red if there is a great influence on the succeeding aircraft 28b, or blue if there is less influence on the succeeding aircraft 28b. By displaying the acquired wake turbulence information for every observation period, one can confirm the changes of the wake turbulence in time series detected by the wake turbulence detecting unit 8 on the display unit.

Further, referring to FIG. 7, display contents of the display device 12 will be described below. FIG. 7 is an explanatory view of display unit partially illustrating a display example as shown in FIG. 6. As described above, the display device 12 also displays the decay time information of the wake turbulence calculated by the decay time prediction section 20 of the central controlling unit 11, and the image synthesizing process section 21 outputs the display signal in which the decay time information of the wake turbulence and other information are synthesized. In FIG. 7, reference numeral 30 denotes a runway displayed on the display unit, and reference numeral 31 denotes the predicted decay time of wake turbulence calculated by the decay time prediction section 20 of the central controlling unit 11. As shown in FIG. 7, not only the magnitude and intensity of the wake turbulence caused by the aircraft taking off or landing but also the decay time information of wake turbulence calculated by the decay time prediction section 20 of the central controlling unit 11 are displayed on the same screen, it is possible to prompt the controller to issue an efficient control instruction.

In this way, the predicted decay time 31 of the wake turbulence detected actually by the wake turbulence detecting unit 8 is displayed on the display unit, along with the wake turbulence 29, so that the controller can issue a take-off instruction safety and rapidly to the succeeding aircraft 28b that is a stand-by state at the end of the runway, thereby allowing the efficient air traffic control of the aircraft.

In the above way, according to the air traffic control support system of this embodiment, the wake turbulence is detected by the wake turbulence detecting unit 8. Further, the decay time of the wake turbulence is predicated on the basis of the weather information at the time of observing the wake turbulence. Hence, the state of the wake turbulence occurring in the runway sky can be grasped, and the decay time of the wake turbulence can be predicated more correctly. The air traffic control is effected on the basis of the precise predicted decay time of the wake turbulence. Therefoer, it is possible to cope with the increasing number of flights, and to realize the safe operations of the aircraft.

The wake turbulence information detected by the wake turbulence detecting unit 8 and the decay time information of the wake turbulence are displayed on the same screen, so that the controller can grasp not only the state of the wake turbulence occurring in the runway sky but also the precise predicted decay time of the wake turbulence. For example, it is possible to issue an adequate air traffic control instruction in advance to the pilot of the succeeding aircraft that is stand-by to take off at the end of the runway, and to prompt the controller to issue an efficient control instruction.

Embodiment 2

An embodiment 2 of the invention will be described below with reference to FIGS. 8 to 10. An air traffic control support system according to the above-described embodiment creates the retrieval address from the aircraft information, the weather information and the wake turbulence information to predict the decay time of the wake turbulence in the runway sky that has been practically detected from a result of retrieval through a retrieval process with the retrieval address. This procedure is suitable to predict the decay time of the wake turbulence that will decay in about two to five minutes since the aircraft takes off or lands. However, if the observation of the wake turbulence by the optical transmitter-receiver 9 in the wake turbulence detecting unit 8, namely, the beam scan with a laser beam can be effected in a short time, it is fully possible to predict the decay time of the wake turbulence occurring in the runway sky from the result of the retrieval by the wake turbulence detecting unit 8. This embodiment will be described in connection with a case of predicting the decay time of the wake turbulence occurring in the runway sky from the result of the retrieval by the wake turbulence detecting unit 8.

Figure 8:
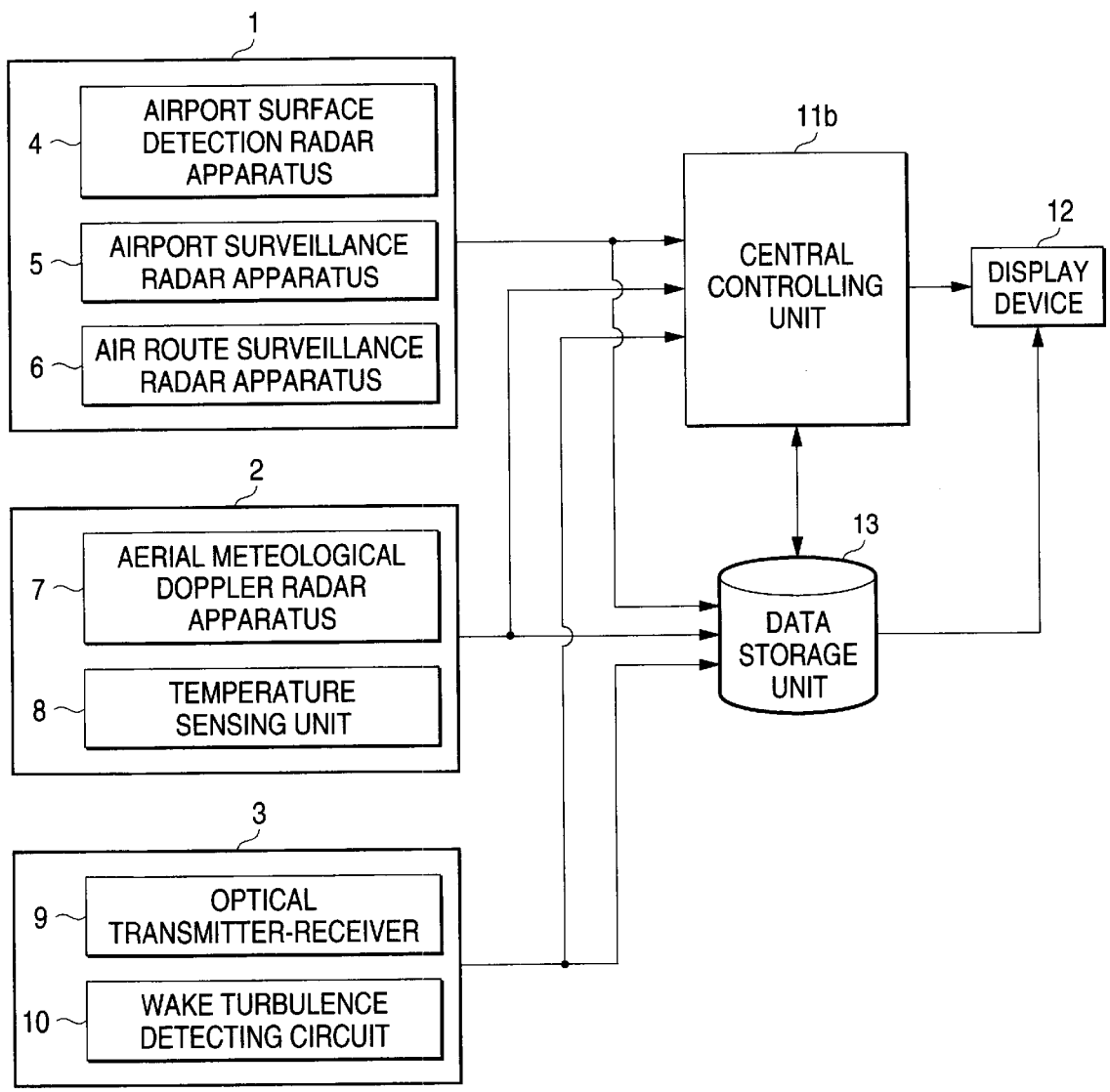
FIG. 8 is a block diagram showing an air traffic control support system according to another embodiment of the invention.
Figure 9:
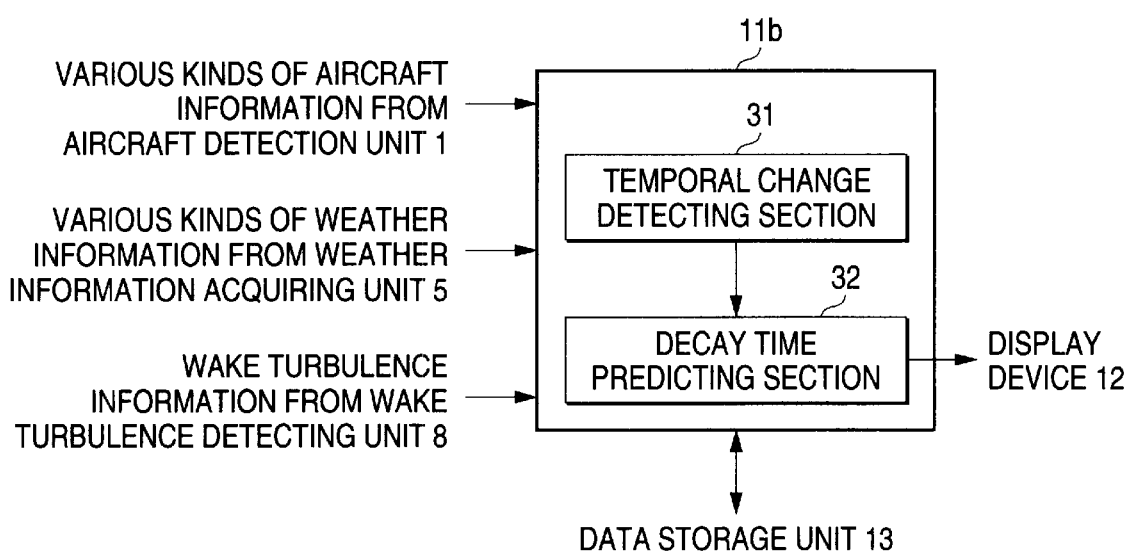
FIG. 9 is a partial block diagram showing partially a specific configuration of a central controlling unit 11b as shown in FIG. 8.

FIG. 8 is a block diagram showing an air traffic control support system according to this embodiment of the invention. FIG. 9 is a partial block diagram showing a specific configuration of a central controlling unit 11b as shown in FIG. 8, and particularly showing a part for performing a prediction process of the decay time for the wake turbulence. Note that the same numerals indicate the same or like parts in the figures. In FIG. 9, reference numeral 31 denotes a temporal change detecting section for accepting the wake turbulence information for every observation period detected by the wake turbulence detecting unit 8 and detecting the temporal change of the wake turbulence occurring in the runway sky from the wake turbulence information for every period, namely, a decay pattern. Reference numeral 32 denotes a decay time prediction section for performing a so-called extrapolation process on the basis of the decay pattern of the wake turbulence detected by the temporal change detecting section 31 and predicating the decay time of the wake turbulence from a result of extrapolation.

A process for predicting the decay time of the wake turbulence in the central controlling unit 11b will be described below. The wake turbulence information for every observation period of the optical transmitter-receiver 9 is detected by the wake turbulence detecting unit 8, and output from the wake turbulence detecting unit 8 to the central controlling unit 11b. The wake turbulence information for every observation period output to the central controlling unit 11b is first input to the temporal change detecting section 31, where the so-called decay pattern of the wake turbulence is detected. The data of the decay pattern of the wake turbulence detected by the temporal change detecting section 31 is input to the decay time prediction section 32, where the so-called extrapolation process is performed on the basis of the decay pattern. As a result of the extrapolation process, the temporal change up to extinction of the wake turbulence is calculated. The predicted decay time of the wake turbulence can be calculated on the basis of the temporal change up to the extinction.

Figure 10:
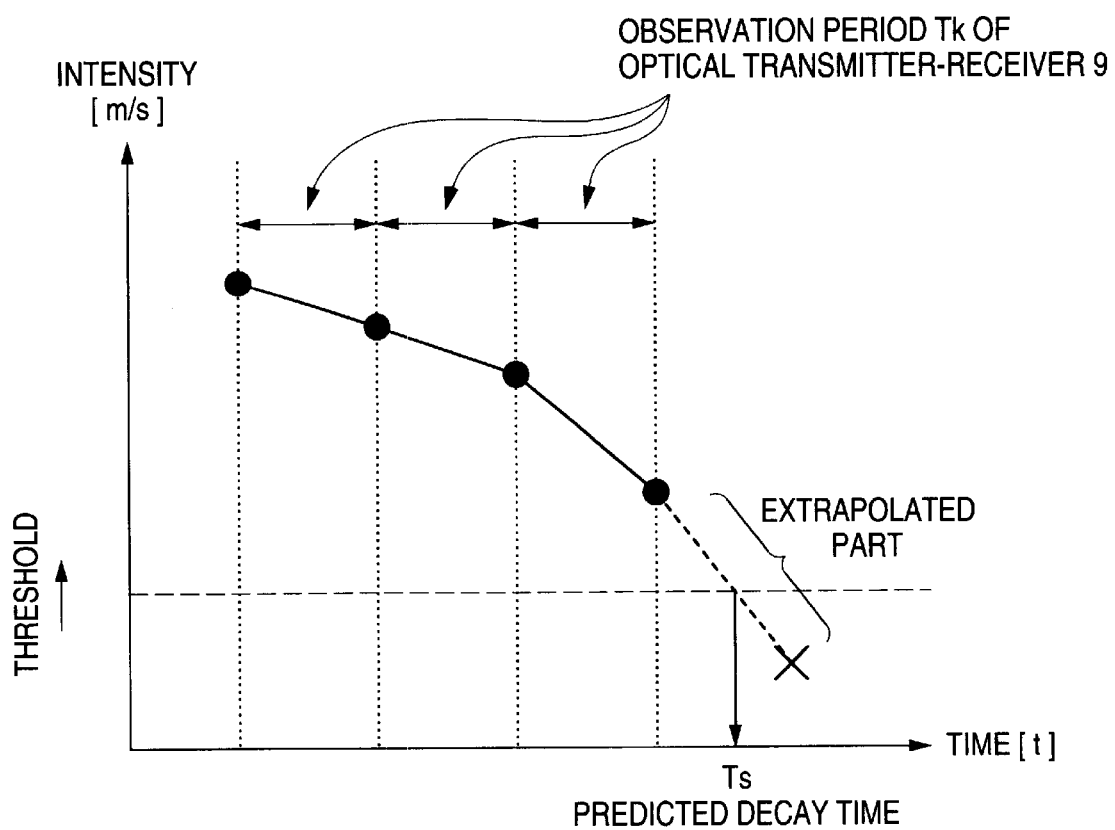
FIG. 10 is a graph for explaining a decay pattern showing an example of temporal changes of the wake turbulence detected by a wake turbulence detecting unit 8 as shown in FIG. 8.

FIG. 10 is an explanatory diagram of the decay pattern illustrating an example of the temporal change of the wake turbulence detected by the wake turbulence detecting unit 8. As shown in FIG. 10, the temporal change detecting section 31 can accept the wake turbulence information from the wake turbulence detecting unit 8 for every observation period Tk of the optical transmitter-receiver 9, and detect a decay pattern as shown in FIG. 10 from the intensity of the wake turbulence. The decay time prediction section 32 can calculate the temporal change of the wake turbulence up to the extinction by the use of the extrapolation process for the data of the decay pattern as shown in FIG. 10. For example, the time ts less than or equal to a threshold (with the intensity to the extent that the take-off or landing of the succeeding aircraft is not affected) of the intensity of the wake turbulence set up in the relation to the succeeding aircraft is output to the display device 12 as the predicted decay time of the wake turbulence. The predicted decay time output to the display device 12 is displayed on the display unit 22 of the display device 12, like the air traffic control support system according to the first embodiment. The extrapolation process may be performed by various approximation methods such as a direct approximation method. In accordance with an inclination of the decay pattern of the wake turbulence detected by the temporal change detecting section 31, a suitable method can be selected.

For example, in a rotary type optical transmitter-receiver, since it takes more time to make beam scanning, the more desired decay patterns are formed, the wake turbulence information is more difficult to obtain. In an electronic scan type optical transmitter-receiver, the fast beam scanning can be performed, and the wake turbulence information for a number of periods can be acquired in a short time. Also, even in the rotary type optical transmitter-receiver, the observation period of the wake turbulence may be shortened by limiting the beam scanning range, and whereby it is possible to predict the decay time of the wake turbulence from the observation result of the rotary type optical transmitter-receiver.

As described above, with the air traffic control support system of this embodiment of the invention, the decay time of the wake turbulence is predicted from the temporal change of the wake turbulence obtained for every observation period of the wake turbulence by the wake turbulence detecting unit 8. The decay time of the wake turbulence can be correctly predicted without providing the database for storing the decay time information of the wake turbulence in the past that was observed under various conditions. Hence, it is possible to cope with the increasing number of flights and realize the safe operations of the aircraft, like the air traffic control support system according to the first embodiment.

The wake turbulence information detected by the wake turbulence detecting unit 8 and the decay time information of the wake turbulence are displayed on the same screen, so that the controller can grasp not only the state of the wake turbulence occurring in the runway sky but also the precise predicted decay time of the wake-turbulence. For example, an air traffic control instruction can be adequately issued in advance to the pilot of the succeeding aircraft that is stand-by to take off at the end of the runway. Hence, the controller can be prompted to issue an efficient air traffic control instruction.

Embodiment 3

Another embodiment of the invention will be described below with reference to FIGS. 11 to 14. In the air traffic control support system of the above-described embodiments, the decay time of the wake turbulence detected by the wake turbulence detecting unit 8 is predicted by the use of the retrieval of cases, or the temporal change (the decay pattern). The predicted decay time is displayed on the display unit of the monitor, along with the wake turbulence information corresponding thereto. Further, the take-off time of the succeeding aircraft that is in a take-off stand-by state may be predicated, and the take-off prediction time information may be displayed on the display unit. This embodiment will be described in connection with a case wherein the take-off prediction time of the succeeding aircraft that is in the take-off stand-by state at the end of the runway, for example, is predicted from the decay time information of the wake turbulence, as described above, and the take-off time information is displayed on the display unit, along with the decay time information of the wake turbulence.

Figure 11:
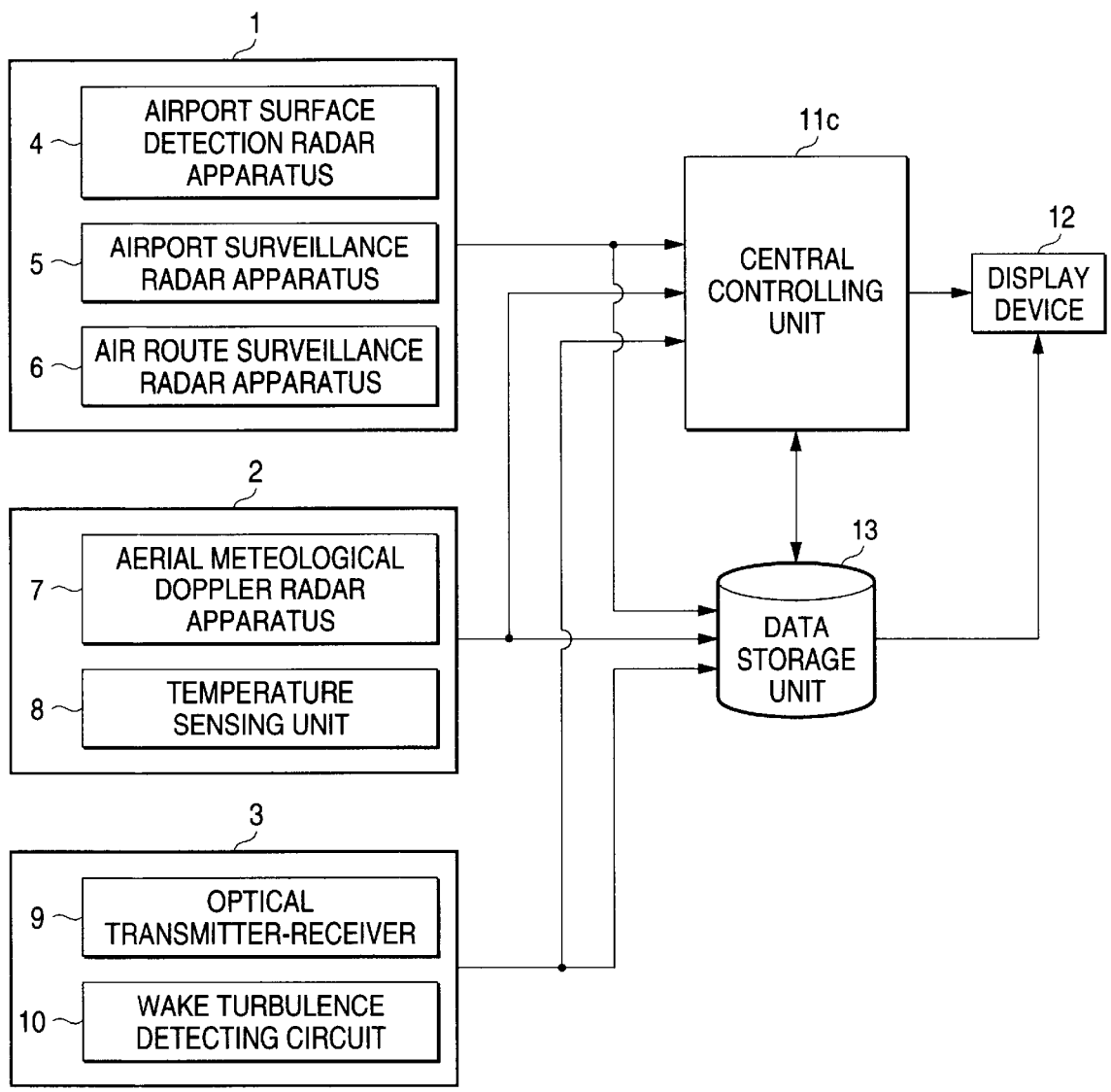
FIG. 11 is a block diagram showing an air traffic control support system according to another embodiment of the invention.
Figure 12:
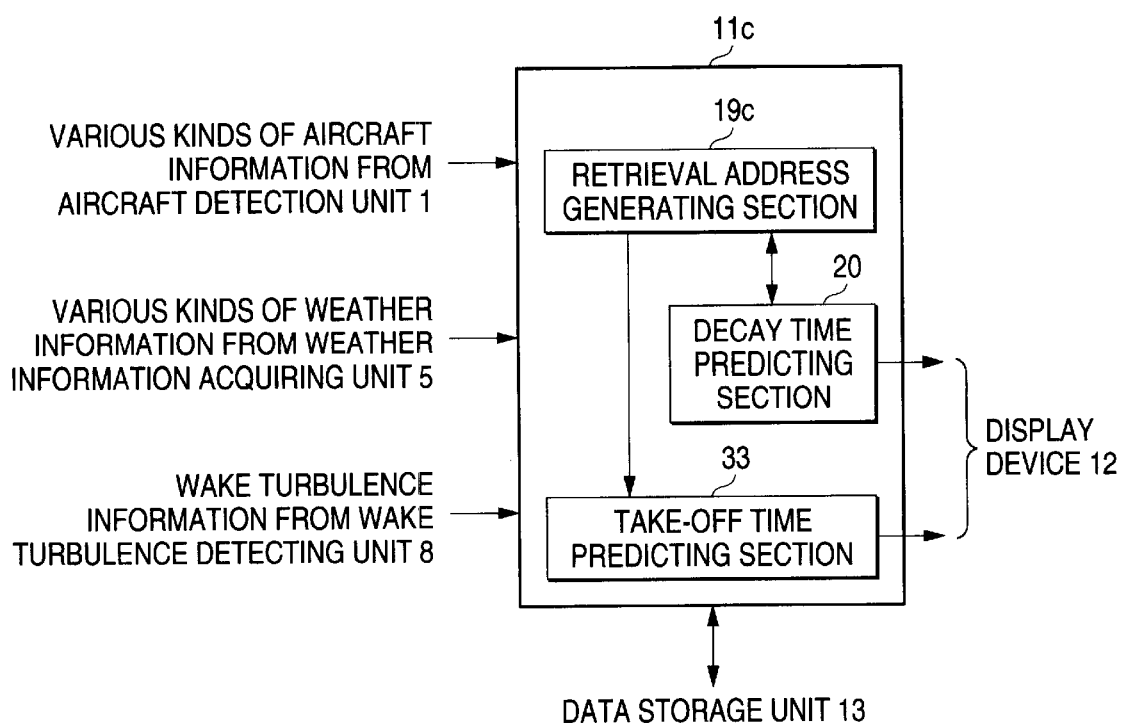
FIG. 12 is a partial block diagram showing partially a specific configuration of a central controlling unit 11c as shown in FIG. 11.

FIG. 11 is a block diagram showing an air traffic control support system according to this embodiment of the invention. FIG. 12 is a partial block diagram showing a specific configuration of a central controlling unit 11c as shown in FIG. 11, and particularly a section of predicting the decay time of the wake turbulence and the take-off time of the succeeding aircraft. Note that the same numerals indicate the same or like parts in the figures. In FIG. 12, reference numeral 19c denotes a retrieval address generating section for generating a retrieval address for prediction of decay time of the wake turbulence, like the retrieval address generating section 19 as shown in FIG. 3, and further the retrieval address for prediction of take-off time of the succeeding aircraft using the decay time information of the wake turbulence predicated by the decay time prediction section 20. Reference numeral 33 denotes a take-off time prediction unit for retrieving the database for storing the take-off time information of the succeeding aircraft in the past, for example, by the retrieval address for the take-off time generated by the retrieval address generating section 19c, and predicting the take-off time of the succeeding aircraft that is in a take-off stand-by state at the end of the runway, for example, on the basis of the result of retrieving the database.

Figure 13:
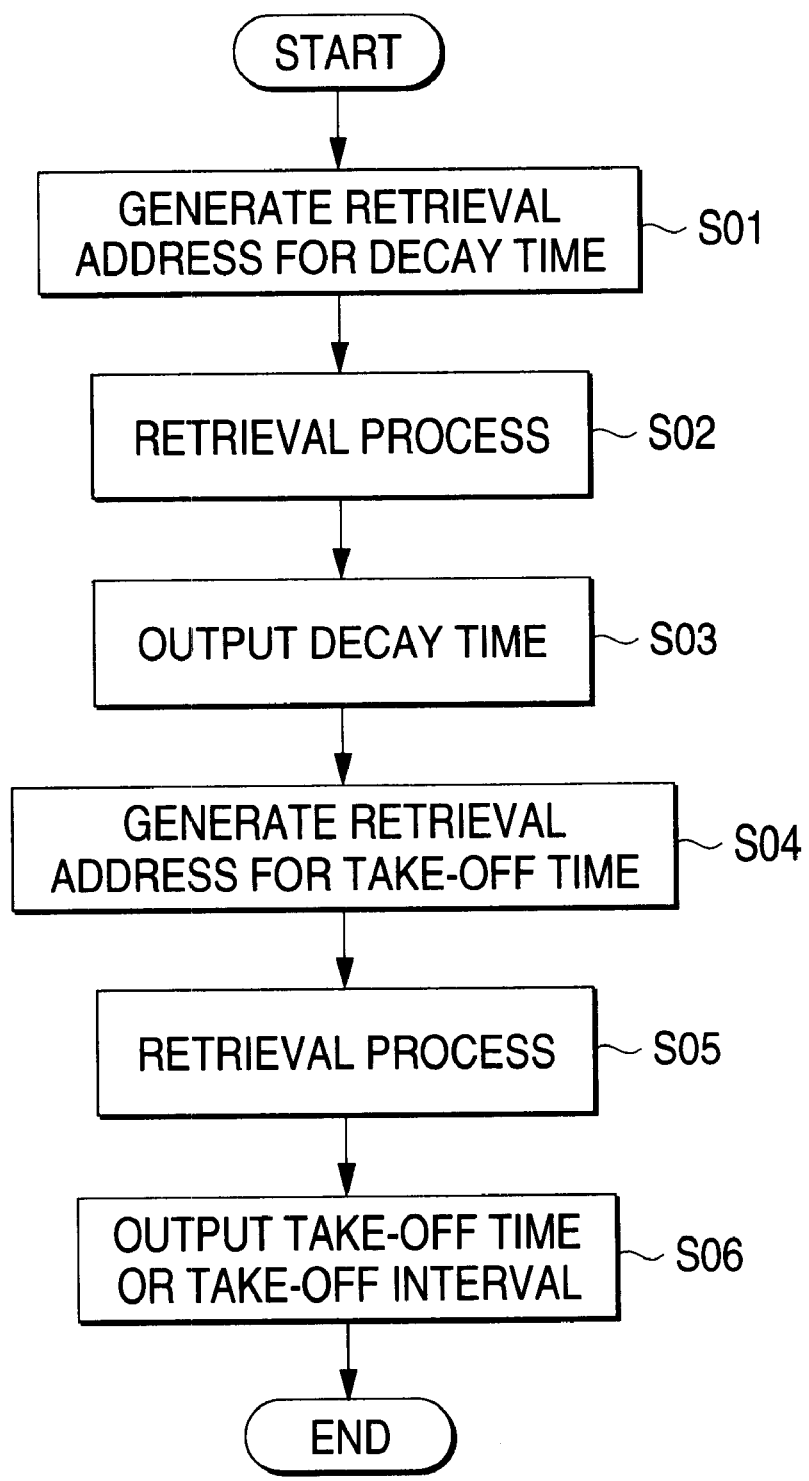
FIG. 13 is a flowchart showing a specific operation procedure of a process for predicting the decay time of the wake turbulence in the central-controlling unit 11c.

The operation of a prediction process in the take-off time prediction unit 33 will be mainly described below. FIG. 13 is a flowchart showing a specific operation procedure of the central controlling unit 11c. The steps S01 to S03 are identical to those of FIG. 4. If the decay time of the wake turbulence detected by the wake turbulence detecting unit 8 is predicted in the decay time prediction section 20, the decay time information is output to the display device 12, and on the other hand, input to the retrieval address generating section 19c, where a retrieval address for prediction of take-off time of the succeeding aircraft that is in a take-off stand-by state at the end of the runway is generated (S04). This retrieval address for prediction of take-off time is made up by the decay time information of the wake turbulence output from the decay time prediction section 20 and the positional information of the preceding aircraft and the succeeding aircraft detected by the aircraft detecting unit 1.

The retrieval address for prediction of take-off time is generated using the decay time information of the wake turbulence obtained by the decay time prediction section 20 to reduce the information as to the retrieval address and to shorten the retrieval time in the take-off time prediction unit 33. If the retrieval address for prediction of take-off time is generated by the retrieval address generating section 19c, the take-off time prediction unit 33 retrieves the database for storing the take-off time information of the succeeding aircraft in the past on the basis of this retrieval address (S05), and calculates the take-off prediction time of the succeeding aircraft that is in a take-off stand-by state at the end of the runway, for example, from the take-off time of the succeeding aircraft in the past corresponding to the retrieval address read from the database and the present time (S06). This take-off time information calculated by the take-off time prediction unit 33 is output to the display device 12, and for example, displayed on the display unit, as shown in FIG. 6, like the decay information of the wake turbulence.

Figure 14:
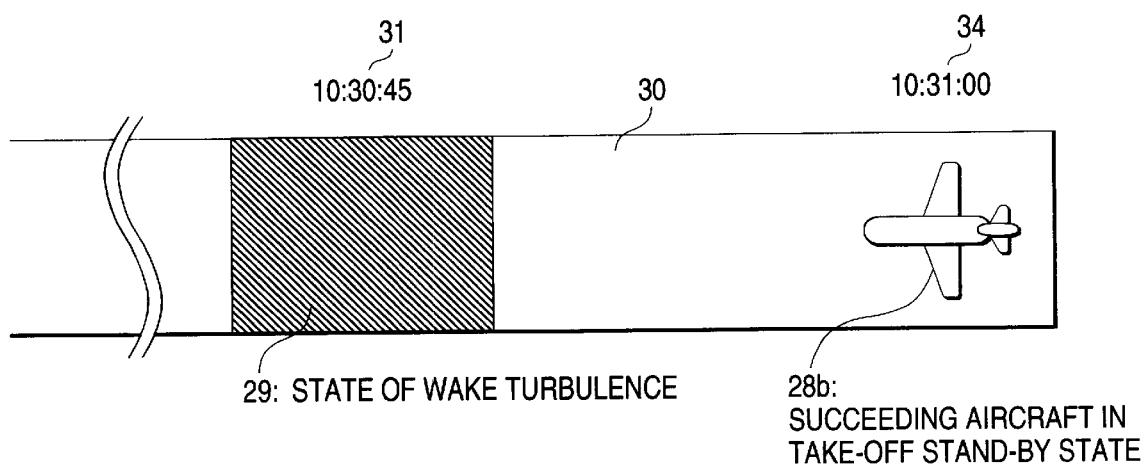
FIG. 14 is an explanatory view of a display screen illustrating partly a display example in a display device 12 as shown in FIG. 11.

FIG. 14 is an explanatory view of a display unit showing partially a display example in this embodiment of the invention. In FIG. 14, reference numeral 34 denotes the take-off prediction time of the succeeding aircraft calculated by the take-off time prediction unit 33 of the central controlling unit 11c and displayed symbolically on an image frame 23 of the display unit 22. Note that the same numerals indicate the same or like parts in the figures. As shown in FIG. 14, the take-off prediction time of a succeeding aircraft 28b calculated by the take-off time prediction unit 33 is displayed on the same screen as a symbolic display of the succeeding aircraft 28b on the basis of the aircraft information detected by the airport surface detection radar apparatus 2, so that the controller can be prompted to issue an air traffic control instruction more efficiently.

As described above, with the air traffic control support system of this embodiment, the take-off time prediction unit 33 for predicting the take-off time of the succeeding aircraft that is in a take-off stand-by state at the end of the runway, for example, is provided to predict the take-off time or landing time of the succeeding aircraft that is in a take-off state from the runway or in a landing state onto the runway. Hence, it is possible to issue an adequate control instruction to the pilot on the succeeding aircraft, in view of the take-off time information of the succeeding aircraft. Further, the controller can be prompted to issue an efficient air traffic control instruction. Therefore, it is possible to cope with the increasing number of flights and to realize the safe operations of the aircraft.

Embodiment 4

Another embodiment of the invention will be described below with reference to FIGS. 15 and 16. In the air traffic control support system of the above-described embodiments, the predicted decay time information of the wake turbulence calculated by the central controlling units, 11, 11b and 11c, or the take-off prediction time information of the succeeding aircraft, is displayed on the display unit 22 of the display device 12 that is placed within a control tower, for example, to prompt the controller to issue an air traffic control instruction in safe and efficient manner. However, the contents of the predicted decay time information of the wake turbulence and the take-off prediction time information of the succeeding aircraft may be informed to the pilot on board the succeeding aircraft that is in a take-off waiting or landing stand-by state. In an air traffic control support system of this embodiment, the predicted decay time of the wake turbulence and the take-off prediction time of the succeeding aircraft are not only displayed on the display unit, but also transmitted by radio to the succeeding aircraft that is in the take-off stand-by state at the end of the runway, for example. Therefore, besides the air traffic control instruction of the controller, the pilot on board the aircraft can confirm the decay time of the wake turbulence detected by the wake turbulence detecting unit 8.

Figure 15:
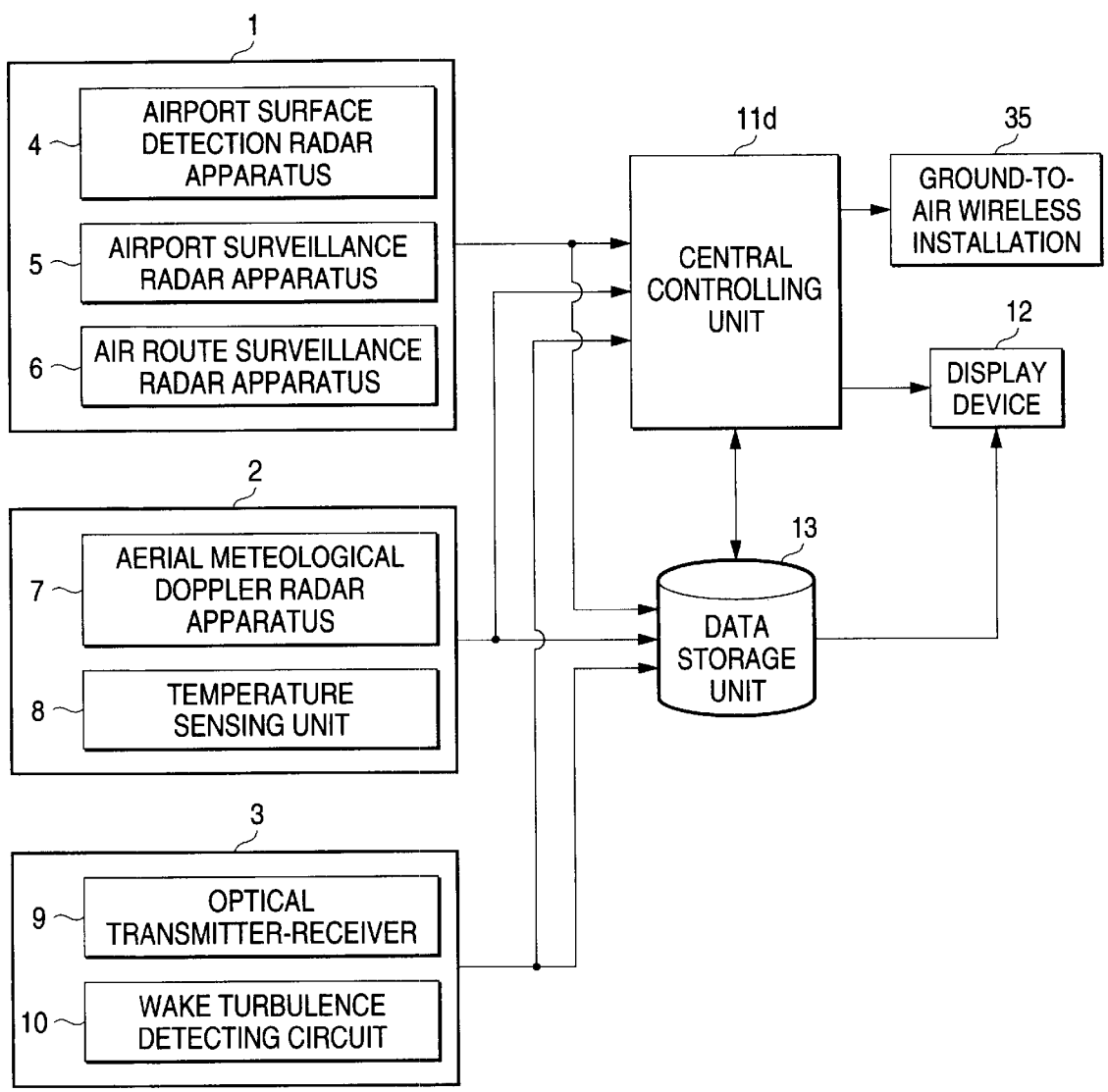
FIG. 15 is a block diagram showing an air traffic control support system according to another embodiment of the invention.
Figure 16:
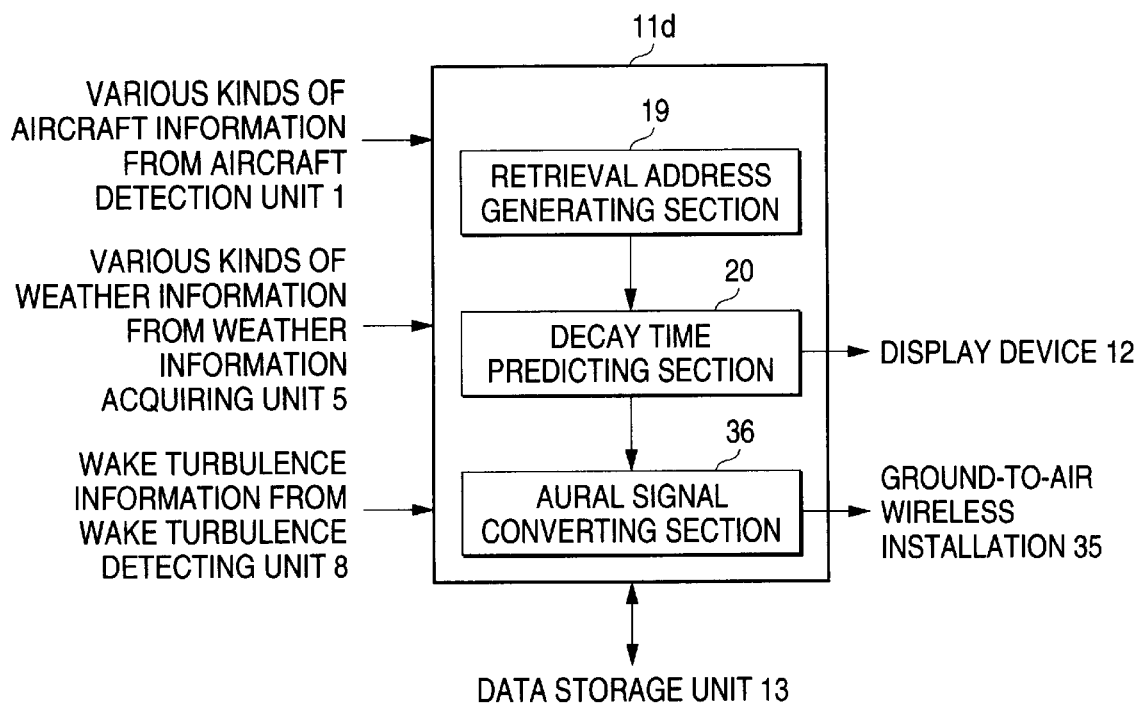
FIG. 16 is a partial block diagram showing partially a specific configuration of a central controlling unit 11d as shown in FIG. 15.

FIG. 15 is a block diagram showing the air traffic control support system according to this embodiment of the invention. FIG. 16 is a partial block diagram showing a specific configuration of a central controlling unit 11d as shown in FIG. 15, and particularly a section for predicting the decay time of the wake turbulence and converting the decay time information of the wake turbulence into an aural signal corresponding thereto. Note that the same numerals indicate the same or like parts in the figures. In FIGS. 15 and 16, reference numeral 35 denotes a ground-to-air wireless installation for transmitting by radio an aural signal corresponding to, for example, the decay time information of the wake turbulence output from the central controlling unit 11d, to the succeeding aircraft that is in a take-off stand-by state at the end of the runway. Reference numeral 36 denotes an aural signal converter for converting the predicted decay time information of the wake turbulence output from the decay time prediction section 20 in the central controlling unit 11d to the aural signal corresponding thereto for outputting to the ground-to-air wireless installation 35. As shown in FIG. 16, the air traffic control support system according to this embodiment predicts only the decay time of the wake turbulence, but can convert the take-off prediction time information of the succeeding aircraft to the aural signal corresponding thereto and transmit by radio the aural signal to the aircraft. The air traffic control support system according to this embodiment may be applicable to the air traffic control support system according to the third embodiment.

An operation will be described below. In case of performing a process of predicting the decay time of the wake turbulence detected by the wake turbulence detecting unit 8 in the decay time prediction section 20 of the central controlling unit 11d, the predicted decay time information of the wake turbulence is output not only to the display device 12 but also to the aural signal converter 36. If the predicted decay time information of the wake turbulence is input from the decay time prediction section 20, the aural signal converter 36 converts the predicted decay time information to the aural signal corresponding thereto for outputting to the ground-to-air wireless installation 35. The ground-to-air wireless installation 35 radio-modulates the predicted decay time information of the wake turbulence converted into the corresponding aural signal by the aural signal converter 36, and transmits by radio the modulated aural signal to the aircraft, for example, the succeeding aircraft that is in a take-off stand-by state at the end of the runway. Incidentally, by providing the aircraft with transmission unit for receiving a radio signal sent from the ground-to-air wireless installation 35 and transmitting its contents to the pilot on board the aircraft, the predicted decay time information of the wake turbulence transmitted by radio from the ground-to-air wireless installation 35 can be informed to the pilot on board the aircraft.

Figure 17:
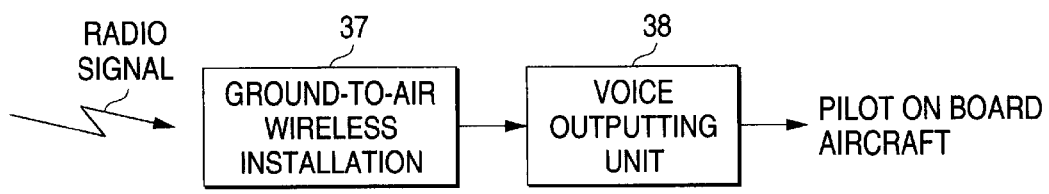
FIG. 17 is a block diagram showing unit for receiving a radio signal from a ground-to-air wireless installation 35 as shown in FIG. 15 and outputting in voice the received signal to a pilot on board the aircraft.

FIG. 17 is a block diagram showing a specific configuration of the air traffic control support system according to this embodiment of the invention, and a control information transmitting unit for receiving various sorts of air traffic control information transmitted by radio from the control tower, for example, and informing the control information to the pilot on board the aircraft. In FIG. 17, reference numeral 37 denotes a radio receiver for receiving a radio signal transmitted by radio from the ground-to-air wireless installation 35; and reference numeral 38 denotes a voice output unit for accepting the aural signal received by the wireless installation 37 and outputting in voice the predicted decay time of the wake turbulence predicted by the decay time prediction section 20 of the central controlling unit 11d as described above.

In this way, the predicted decay time information of the wake turbulence predicted by the decay time prediction section 20 is not only displayed on the display unit 22 of the display device 12, but also transmitted by radio to the aircraft and output in voice to the pilot on board the aircraft. Therefore, the controller can be prompted to issue an air traffic control instruction in safe and efficient manner. Further, the pilot can confirm the precise control instruction of the controller and perform the take-off or landing operation, so that it is possible to realize the air traffic control that is safer and more efficient. Normally, in the case where there occurs the wake turbulence in the runway sky caused by the aircraft taking off or landing, the controller issues an air traffic control instruction with a full time interval in view of the safety of the succeeding aircraft or in accordance with the air traffic control rules in consideration of the influence of the wake turbulence. Hence, the safety of the succeeding aircraft can be secured sufficiently. However, with the air traffic control support system according to this embodiment, the double confirmation by the controller and the pilot on board the aircraft can be performed. As a result, the safety and efficiency of the air traffic control can be realized, which is less inefficient than the control instruction in accordance with the control rules with a full time interval as conventionally performed.

As described above, with the air traffic control support system according to this embodiment, the predicted decay time information of the wake turbulence predicted by the decay prediction unit 20 of the central controlling unit 11d, for example, is transmitted by radio to the aircraft to allow the pilot on board the aircraft to confirm the contents of the predicted decay time information. Hence, in addition to the same effects of the previous embodiments of the invention, the double confirmation by the controller and the pilot on board the aircraft for the decay of the wake turbulence occurring in the runway sky can be effected. As a result, the safer and more efficient air traffic control can be realized.

Embodiment 5

Another embodiment of the invention will be described below with reference to FIGS. 18 and 20. In the air traffic control support system according to the previous embodiments, the predicted decay time information of the wake turbulence calculated in the central controlling unit 11d or the take-off prediction time information of the succeeding aircraft is converted into the aural signal corresponding thereto and transmitted by radio to the aircraft. However, in the case where the predicted decay time information of the wake turbulence or the take-off prediction time information of the succeeding aircraft is transmitted by radio in voice to the aircraft side, the contents may not be possibly conveyed to the pilot correctly, when the voice output level is small. An air traffic control support system according to this embodiment converts the predicted decay time information of the wake turbulence and the take-off prediction time information of the succeeding aircraft into a message signal corresponding thereto and transmits by radio the message signal to the aircraft, so that the pilot on board the aircraft can confirm the predicted decay time of the wake turbulence visually.

Figure 18:
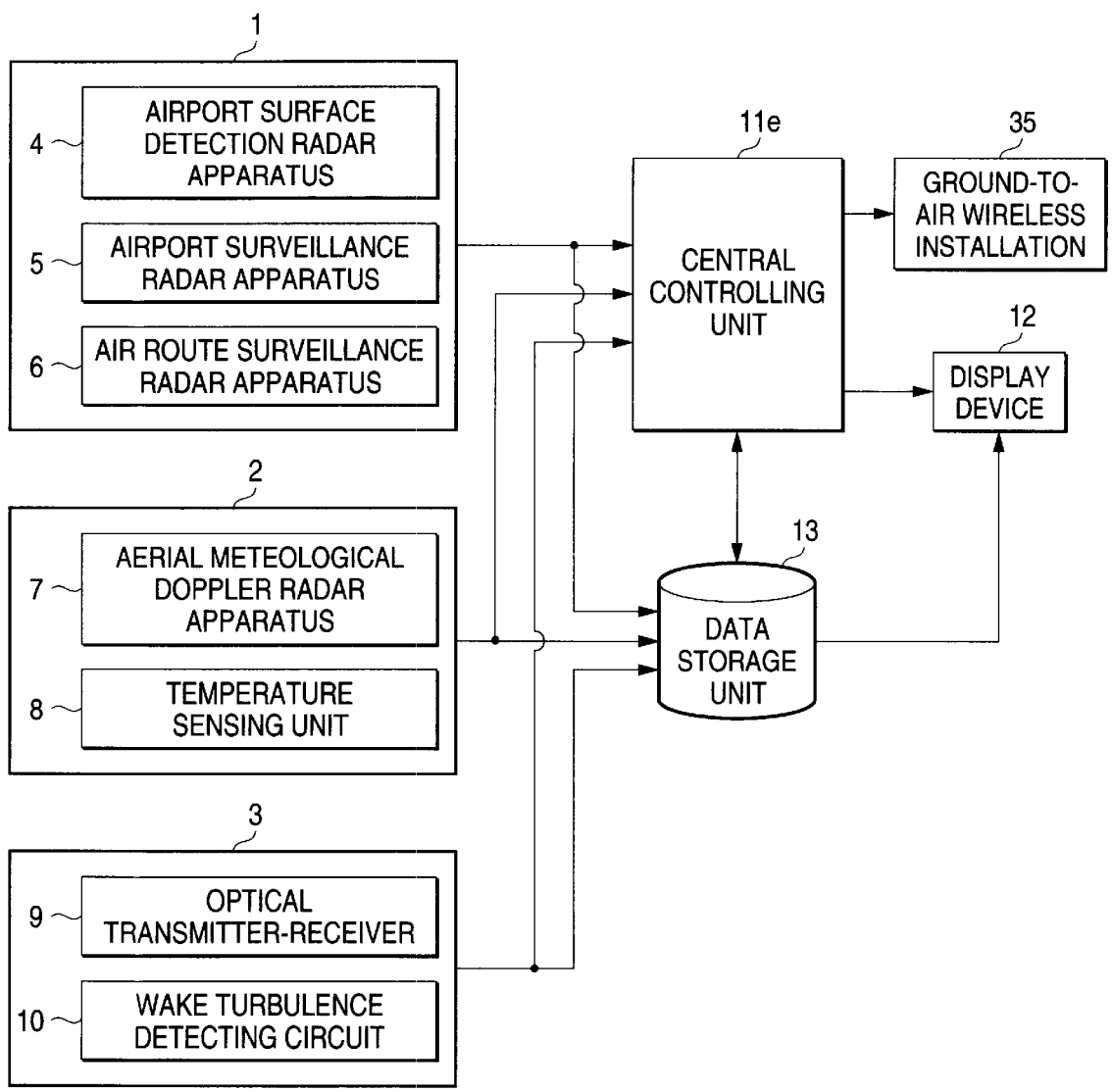
FIG. 18 is a block diagram showing an air traffic control support system according to another embodiment of the invention.
Figure 19:
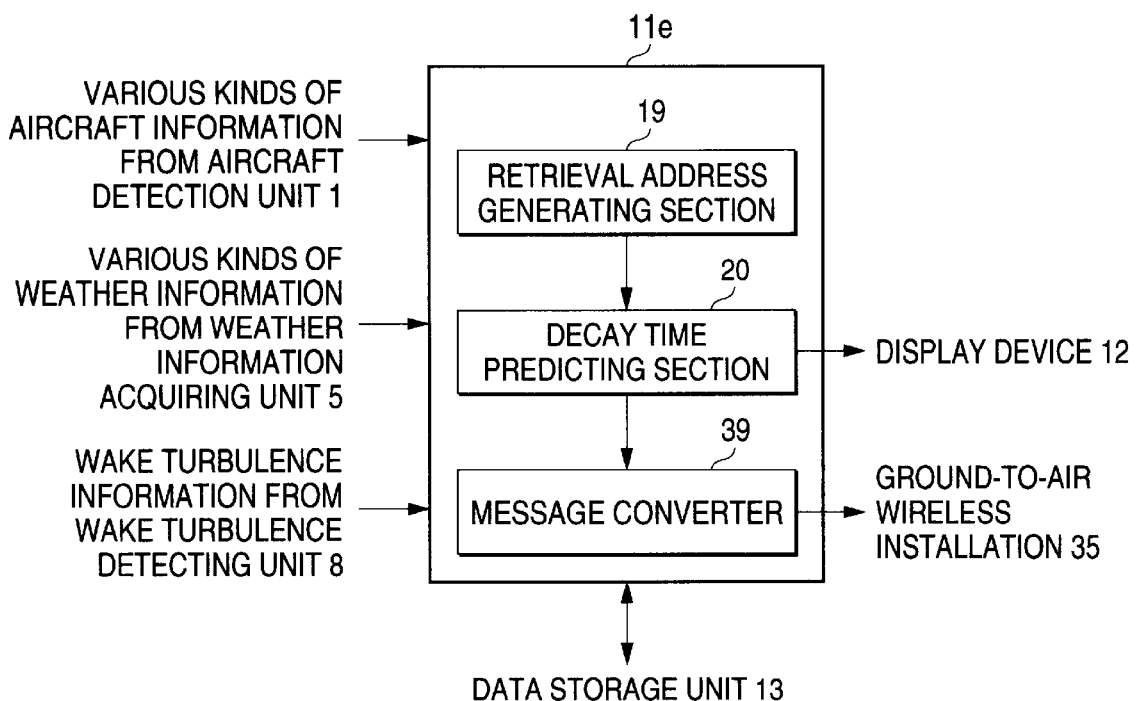
FIG. 19 is a partial block diagram showing partially a specific configuration of a central controlling unit 11e as shown in FIG. 18.

FIG. 18 is a block diagram showing the air traffic control support system according to this embodiment of the invention. FIG. 19 is a partial block diagram showing a specific configuration of a central controlling unit 11e as shown in FIG. 18, and particularly a section for predicting the decay time of the wake turbulence and converting the decay time information of the wake turbulence to a message signal corresponding thereto. Note that the same numerals indicate the same or like parts in the figures. In FIG. 19, reference numeral 39 denotes a message converter for converting the predicted decay time information of the wake turbulence output from the decay time prediction section 20 in the central controlling unit 11e into the message signal corresponding thereto to be transmitted to the wireless installation 35. As shown in FIG. 19, the air traffic control support system of this embodiment predicts only the decay time of the wake turbulence, but can convert the take-off prediction time information of the succeeding aircraft to an aural signal corresponding thereto and transmit by radio the aural signal to the aircraft. The air traffic control support system according to this embodiment may be applicable to the air traffic control support system according to the third embodiment.

An operation will be described below. Up to the prediction of the decay time of the wake turbulence by the decay time prediction section 20, the operation is identical to the air traffic control support system according to the fourth embodiment. If the predicted decay time information of the wake turbulence is input from the decay time prediction section 20, a message converter 39 converts this predicted decay time information to a message signal corresponding thereto to be output to the wireless installation 35. The wireless installation 35 radio-modulates the predicted decay time information of the wake turbulence converted into the corresponding message signal by the message converter 39, and transmits by radio the radio-modulated message signal to the aircraft, for example, the succeeding aircraft that is in a take-off stand-by state at the end of the runway. FIG. 20 is a block diagram showing a specific configuration for carrying out the air traffic control support system of this embodiment, and showing an air traffic control information transmitting unit for receiving various kinds of air traffic control information transmitted by radio from, for example, a control tower, and informing the pilot on board the aircraft. In FIG. 20, reference numeral 40 denotes a display conversion circuit for accepting the message signal received by the wireless receiver 37 and converting the message signal into a display signal in a display form of an onboard display device 41 provided within the aircraft.

Figure 20:
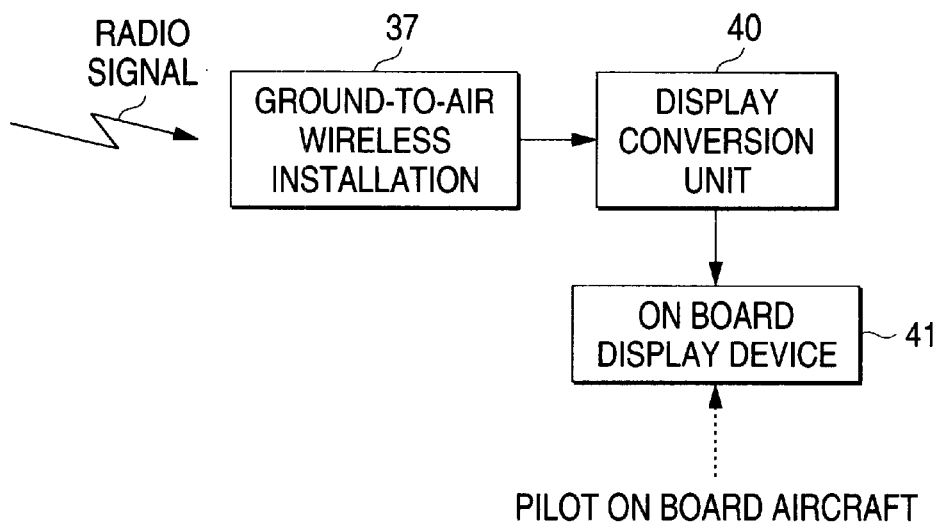
FIG. 20 is a block diagram showing unit for receiving a radio signal from a ground-to-air wireless installation 35 as shown in FIG. 18 and displaying a message to the pilot on board the aircraft.

As shown in FIG. 20, the message signal corresponding to the predicted decay time information transmitted by radio from the wireless installation 35 is converted into the display signal in the display form of the onboard display device 41 provided within the aircraft. In this way, the predicted decay time information of the wake turbulence predicted by the decay time prediction section 20 is displayed not only on the display unit 22 of the display device 12, but also on the onboard display device 41. Hence, the pilot on board the aircraft can confirm visually the precise control instruction of the control, so that the air traffic control can be realized in safe and efficient manner.

Figure 21:
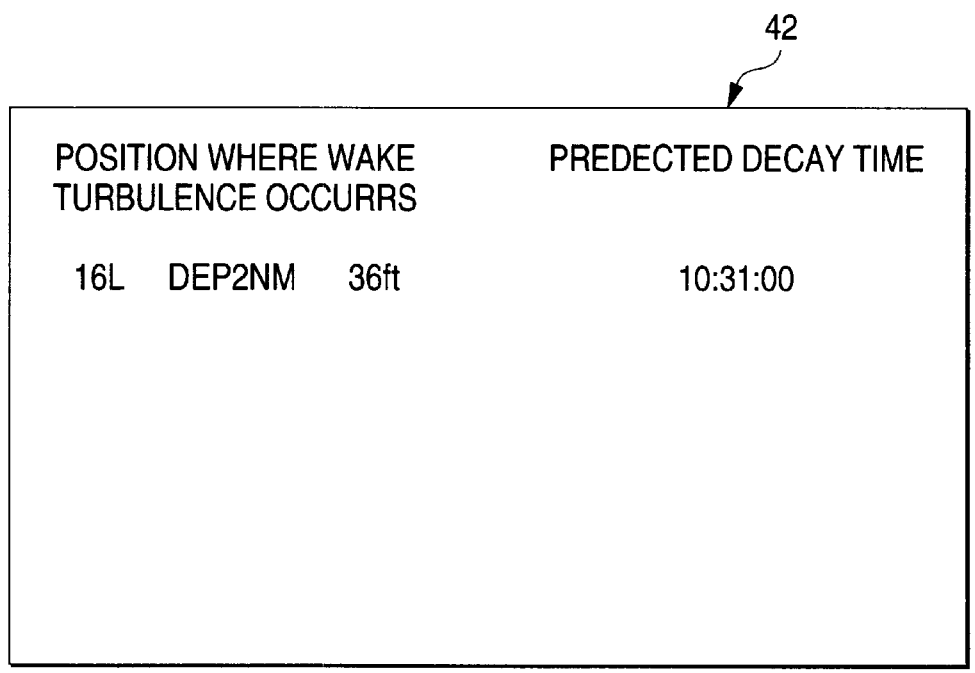
FIG. 21 is an explanatory view of a display screen illustrating a display example in an onboard display device 41 as shown in FIG. 20.

FIG. 21 is an explanatory view of the display showing a display example for the onboard display device 41. In FIG. 21, reference numeral 42 denotes a text example of a message text displayed on the display unit of the onboard display device 41, for example, there occurs a wake turbulence with a wind velocity difference of 36 ft at a position of the runway 16 L in a take-off side observation range (departure area) 2 NM (NAUTICAL MILE), and the predicted decay time of the wake turbulence is 10:31 (e.g., the departure area is represented by DEP, and the arrival area is represented by ARR). In this way, in the onboard display device 41, the message text of the wake turbulence as shown in FIG. 21 may be displayed on the display unit.

As described above, with the air traffic control support system of this embodiment, the predicted decay time information of the wake turbulence predicted in the decay time prediction section 20 of the central controlling unit 11e, for example, is converted into the message signal, transmitted by radio to the aircraft, and displayed on the onboard display device 41 of the aircraft. Hence, the pilot on board the aircraft can confirm visually the contents of the predicted decay time information, and confirm the contents the predicted decay time information in an easier manner than the voice output. As a result, the air traffic control can be realized in safer and more efficient manner.

The invention according to the first aspect comprises:
a wake turbulence detecting unit adapted to detect a wake turbulence occurring in a runway sky due to taking off or landing of an aircraft; and
a decay time predicting unit adapted to predict decay time of the wake turbulence. Hence, the precise decay time information of the wake turbulence occurring in the runway sky can be obtained. As a result, it is possible to cope with the increasing number of flights, and realize the safer air traffic control.

The invention according to the second aspect comprises:
a wake turbulence detecting unit adapted to detect a wake turbulence occurring in a runway sky due to taking off or landing of an aircraft;
a decay time predicting unit adapted to predict decay time of the wake turbulence;
a weather information acquiring unit adapted to acquire weather information in the surroundings around the runway; and
a display unit adapted to display the decay time,
wherein the decay time predicting unit predicts the decay time of the wake turbulence detected by the wake turbulence detecting unit on the basis of the weather information. Hence, the precise decay time information of the wake turbulence occurring in the runway sky can be obtained. As a result, it is possible to cope with the increasing number of flights, and realize the safer air traffic control.

In the invention according to the third aspect, the weather information acquiring unit has an airport meteorological Doppler radar installed within an airport. Therefore, a safer air traffic control can be realized on the basis of the precise decay time information.

The invention according to the fourth aspect comprises:
a wake turbulence detecting unit adapted to detect a wake turbulence occurring in a runway sky due to taking off or landing of an aircraft;
a decay time predicting unit adapted to predict decay time of the wake turbulence;
an aircraft detecting unit adapted to detect airframe information of an aircraft;
a take-off time predicting unit adapted to predict take-off time of the aircraft being stand-by to take off on the runway, on the basis of the airframe information of the aircraft and the decay time; and
a display unit adapted to display the take-off time. Therefore, the correct take-off time information of the aircraft that is stand-by to take off on the runway can be obtained from the decay time information of the wake turbulence. Consequently, it is possible to cope with the increasing number of flights, and realize a safer air traffic control.

The invention according to the fifth aspect comprises:
a wake turbulence detecting unit adapted to detect a wake turbulence occurring in a runway sky due to taking off or landing of an aircraft;

a decay time predicting unit adapted to predict decay time of the wake turbulence;

a data storage unit adapted to store past decay time information of wake turbulence occurring in the runway sky; and a display unit adapted to display the decay time, wherein the decay time predicting unit extracts, from the past decay time information, decay time information corresponding to the wake turbulence detected by the wake turbulence detecting unit to calculate the decay time of the wake turbulence detected by the wake turbulence detecting unit on the basis of the decay time information. As a result, the precise decay time information of the wake turbulence occurring in the runway sky can be obtained in a shorter time. Thus, it is possible to cope with the increasing number of flights and realize a safer air traffic control in more efficient manner.

The invention according to the sixth aspect comprises:

a wake turbulence detecting unit adapted to detect a wake turbulence occurring in a runway sky due to taking off or landing of an aircraft;

a decay time predicting unit adapted to predict decay time of the wake turbulence; and a display unit adapted to display the decay time, wherein the decay time predicting unit predicts the decay time on the basis of temporal changes of the wake turbulence detected by the wake turbulence detecting unit. Hence, the precise decay time information of the wake turbulence occurring in the runway sky can be obtained without providing the data storage unit for storing the past decay time information of the wake turbulence that arose in the past. Thus, it is possible to cope with the increasing number of flights and realize a safe air traffic control.

The invention according to the seventh aspect comprises:

a wake turbulence detecting unit adapted to detect a wake turbulence occurring in a runway sky due to taking off or landing of an aircraft;

a decay time predicting unit adapted to predict decay time of the wake turbulence; and a transmission unit adapted to convert the decay time into an aural signal and transmit the aural signal to an aircraft being stand-by to take off or land, wherein the aural signal is output in voice on the aircraft. Therefore, the pilot on board the aircraft can confirm a precise air traffic control instruction issued from the controller. Thus, it is possible to cope with the increasing number of flights and realize a safer air traffic control.

The invention according to the eighth aspect comprises:

a wake turbulence detecting unit adapted to detect a wake turbulence occurring in a runway sky due to taking off or landing of an aircraft;

a decay time predicting unit adapted to predict decay time of the wake turbulence; and a transmission unit adapted to convert the decay time into a message signal and transmit the message signal to an aircraft being stand-by to take off or land, wherein the message signal is displayed on the aircraft. Hence, the pilot on board the aircraft can confirm a precise air traffic control issued from the controller. Accordingly, it is possible to cope with the increasing number of flights and realize a safer air traffic control.

The invention according to the ninth aspect comprises:

an aircraft detecting unit adapted to detect an aircraft by the use of a plurality of radar apparatuses and to generate aircraft information;

a data storage unit adapted to store map information corresponding to the plurality of radar apparatuses;

a wake turbulence detecting unit adapted to detect a wake turbulence occurring in a runway sky due to taking off or landing of an aircraft and to generate wake turbulence information;

an image synthesizing process section adapted to synthesize images of the aircraft information, the map information, and the wake turbulence information to output the images as air traffic control information corresponding to the plurality of radar apparatuses; and a display unit adapted to display the air traffic control information in a plurality of subwindows positioned on a screen. Hence, the controller can be prompted to issue an air traffic control instruction in more efficient manner. Therefore, it is possible to cope with the increasing number of flights and realize a safer air traffic control.

In the invention according to the tenth aspect, the wake turbulence detecting unit has an optical transmitter-receiver scanning with a laser beam. As a result, the information as to the wake turbulence occurring in the runway sky can be detected at high precision. Thus, the decay time information can be acquired more precisely.

What is claimed is:

1. An air traffic control system comprising:

a wake turbulence detecting unit adapted to detect a wake turbulence occurring in a runway sky due to taking off or landing of an aircraft; and a decay time predicting unit adapted to predict decay time to the wake turbulence, wherein the decay time predicting unit extracts, from past decay time information, decay time information corresponding to the wake turbulence detected by the wake turbulence detecting unit to calculate the decay time of the wake turbulence detected by the wake turbulence detecting unit on the basis of the decay time information.

2. The system according to claim 1, further comprising:

a weather information acquiring unit adapted to acquire weather information in the surroundings around the runway; and a display unit adapted to display the decay time, wherein the decay time predicting unit predicts the decay time of the wake turbulence detected by the wake turbulence detecting unit on the basis of the weather information.

3. The system according to claim 2, wherein the weather information acquiring unit has an airport meteorological Doppler radar installed within an airport.

4. The system according to claim 1, further comprising:

an aircraft detecting unit adapted to detect airframe information of an aircraft;

a take-off time predicting unit adapted to predict take-off time of the aircraft being stand-by to take off on the runway, on the basis of the airframe information of the aircraft and the decay time; and a display unit adapted to display the take-off time.

5. The system according to claim 1, further comprising:

a data storage unit adapted to store past decay time information of wake turbulence occurring in the runway sky; and a display unit adapted to display the decay time.

6. The system according to claim 1, further comprising a display unit adapted to display the decay time, wherein the decay time predicting unit predicts the decay time on the basis of temporal changes of the wake turbulence detected by the wake turbulence detecting unit.

7. An air traffic control support system comprising:
a wake turbulence detecting unit adapted to detect a wake turbulence occurring in a runway sky due to taking off or landing of an aircraft;
a decay time predicting unit adapted to predict decay time of the wake turbulence; and
a transmission unit adapted to convert the decay time into an aural signal and transmit the aural signal to an aircraft on stand-by to take off or land,
wherein the aural signal is output in voice on the aircraft.

8. An air traffic control support system comprising:
a wake turbulence detecting unit adapted to detect a wake turbulence occurring in a runway sky due to taking off or landing of an aircraft;
a decay time predicting unit adapted to predict decay time of the wake turbulence; and
a transmission unit adapted to convert the decay time into a message signal and transmit the message signal to an aircraft on stand-by to take off or land,
wherein the message signal is displayed on the aircraft.

9. An air traffic control support system comprising:
a wake turbulence detecting unit adapted to detect a wake turbulence occurring in a runway sky due to taking off or landing of an aircraft; and
a decay time predicting unit adapted to predict decay time of the wake turbulence,
wherein the wake turbulence detecting unit has an optical transmitter-receiver scanning with a laser beam.

10. An air traffic control support system comprising:
an aircraft detecting unit adapted to detect an aircraft by the use of a plurality of radar apparatuses and to generate aircraft information;
a data storage unit adapted to store map information corresponding to the plurality of radar apparatuses;
a wake turbulence detecting unit adapted to detect a wake turbulence occurring in a runway sky due to taking off or landing of an aircraft and to generate wake turbulence information;
an image synthesizing process section adapted to synthesize images of the aircraft information, the map information, and the wake turbulence information to output the images as air traffic control information corresponding to the plurality of radar apparatuses; and
a display unit adapted to display the air traffic control information in a plurality of subwindows positioned on a screen.

11. The system according to claim 10, wherein the wake turbulence detecting unit has an optical transmitter-receiver scanning with a laser beam.

12. An air traffic control support system comprising:
means for detecting wake turbulence occurring in a runway sky due to taking off or landing of an aircraft; and
means for predicting decay time of the wake turbulence,
wherein the means for predicting extracts, from past decay time information, decay time information corresponding to the wake turbulence detected by the means for detecting a wake turbulence to calculate the decay time of the wake turbulence detected by the means for detecting a wake turbulence on the basis of the decay time information.

13. The system according to claim 12, further comprising:
means for acquiring weather information in the surroundings around the runway; and means for displaying the decay time,
wherein the means for predicting predicts the decay time of the wake turbulence detected by the means for detecting wake turbulence on the basis of the weather information.

14. The system according to claim 13, wherein the means for acquiring weather information has an airport meteorological Doppler radar installed within an airport.

15. The system according to claim 12, further comprising:
means for detecting airframe information of an aircraft;
means for predicting take-off time of the aircraft on stand-by to take off on the runway on the basis of the airframe information of the aircraft and the decay time; and
means for displaying the take-off time.

16. The system according to claim 12, further comprising:
means for storing past decay time information of wake turbulence occurring in the runway sky; and
means for displaying the decay time.

17. The system according to claim 12, further comprising means for displaying the decay time, wherein the means for predicting the decay time predicts the decay time on the basis of temporal changes of the wake turbulence detected by the means for detecting a wake turbulence.

18. The system according to claim 12, further comprising means for converting the decay time into an aural signal and for transmitting the aural signal to an aircraft on stand-by to take off or land,
wherein the aural signal is output in voice on the aircraft.

19. The system according to claim 12, further comprising means for converting the decay time into a message signal and for transmitting the message signal to an aircraft on stand-by to take off or land,
wherein the message signal is displayed on the aircraft.

20. The system according to claim 12, wherein the means for detecting a wake turbulence has means for scanning and the means for scanning includes an optical transmitter-receiver scanning with a laser beam.

21. An air traffic control support system comprising:
means for detecting an aircraft by the use of a plurality of radar apparatuses and for generating aircraft information;
means for storing map information corresponding to the plurality of radar apparatuses;
means for detecting a wake turbulence occurring in a runway sky due to taking off or landing of an aircraft and for generating wake turbulence information;
means for synthesizing images of the aircraft information, the map information, and the wake turbulence information to output the images as air traffic control information corresponding to the plurality of radar apparatuses; and
means for displaying the air traffic control information in a plurality of subwindows positioned on a screen.

22. The system according to claim 21, wherein the means for detecting a wake turbulence has an optical transmitter-receiver scanning with a laser beam.

23. An air traffic control support system comprising:
means for detecting a wake turbulence occurring in a runway sky due to taking off or landing of an aircraft;
means for predicting decay time of the wake turbulence; and
means for converting the decay time into an aural signal and for transmitting the aural signal to an aircraft on stand-by to take off or land,
wherein the aural signal is output in voice on the aircraft.

24. An air traffic control support system comprising:

means for detecting a wake turbulence occurring in a runway sky due to taking off or landing of an aircraft;

means for predicting decay time of the wake turbulence; and means for converting the decay time into a message signal and for transmitting the message signal to an aircraft on stand-by to take off or land.

wherein the message signal is displayed on the aircraft.

25. An air traffic control support system comprising:

means for detecting a wake turbulence occurring in a runway sky due to taking off or landing of an aircraft; and means for predicting decay time of the wake turbulence, wherein the means for detecting wake turbulence has an optical transmitter-receiver scanning with a laser beam.

* * * * *